(12) United States Patent  
Funazaki

(10) Patent No.: US 7,421,196 B2  
(45) Date of Patent: Sep. 2, 2008

(54) FILM DIGITIZE DEVICE AND PICTURE MANAGEMENT PROGRAM

(75) Inventor: Fumihiro Funazaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 312 days.

(21) Appl. No.: 11/081,552

(22) Filed: Mar. 17, 2005

(65) Prior Publication Data

US 2005/0206975 A1  Sep. 22, 2005

(30) Foreign Application Priority Data

Mar. 18, 2004  (JP) ............................. 2004-078448

(51) Int. Cl.  
H04N 1/04  (2006.01)
(52) U.S. Cl. .................... 396/429; 358/487
(58) Field of Classification Search ............... 396/311, 396/429; 348/96, 207.2, 333.05; 358/487
See application file for complete search history.

(56) References Cited

U.S. PATENT DOCUMENTS

| | | | | |
|---|---|---|---|---|
| 5,633,733 A * | 5/1997 | Miyazawa | .................. | 358/527 |
| 5,703,701 A * | 12/1997 | Yamamoto et al. | .......... | 358/487 |
| 5,808,667 A * | 9/1998 | Sugiyama | .................... | 348/96 |
| 5,943,050 A * | 8/1999 | Bullock et al. | ............... | 715/783 |
| 6,331,903 B1 * | 12/2001 | Nakazawa et al. | .......... | 358/487 |
| 6,344,873 B1 * | 2/2002 | Matsushima | .................. | 348/96 |
| 6,683,649 B1 * | 1/2004 | Anderson | ............... | 348/333.05 |
| 6,738,075 B1 * | 5/2004 | Torres et al. | ................. | 715/723 |
| 6,750,902 B1 * | 6/2004 | Steinberg et al. | .......... | 348/211.3 |
| 2001/0016118 A1 * | 8/2001 | Saito et al. | ................... | 396/311 |
| 2002/0024608 A1 * | 2/2002 | Ejima et al. | ............. | 348/333.05 |
| 2002/0140808 A1 * | 10/2002 | Tsuji | ........................... | 348/96 |

FOREIGN PATENT DOCUMENTS

| | | |
|---|---|---|
| JP | 7-307894 A | 11/1995 |
| JP | 8-212330 | 8/1996 |
| JP | 8-286291 A | 11/1996 |
| JP | 9-214868 A | 8/1997 |
| JP | 9-223224 | 8/1997 |
| JP | 2003-209649 | 7/2003 |

* cited by examiner

Primary Examiner—W. B. Perkey  
(74) Attorney, Agent, or Firm—Birch, Stewart, Kolasch & Birch, LLP

(57) ABSTRACT

According to the present invention, the picture data pieces read from the same film are recorded on a recording medium along with information of the same film ID. This enables the film digitize device to easily extract picture data pieces read from the same film by reading information of film ID given to the picture data pieces when the device capture the picture data pieces recorded on a recording medium, for example, into a personal computer for management. If extracted picture files come with frame numbers in the reverse order of the pictures taken, the film digitize device can rearrange the frame numbers in the order the pictures taken by reversing the frame numbers in block.

24 Claims, 20 Drawing Sheets

FIG.4

ADDITIONAL INFORMATION

| A. TAG REGARDING VERSION |
|---|
| Exif VERSION |
| CORRESPONDING FLASH PICKS VERSION |

| B. TAG REGARDING CHARACTERISTICS OF PICTURE DATA |
|---|
| COLOR SPACE INFORMATION |

| C. TAG REGARDING CONFIGURATION |
|---|
| MEANING OF EACH COMPONENT |
| PICTURE COMPRESSION MODE |
| EFFECTIVE WIDTH OF PICTURE |
| EFFECTIVE HEIGHT OF PICTURE |

| D. TAG REGARDING USER INFORMATION |
|---|
| MANUFACTURER'S NOTE |
| USER COMMENT |

| E. TAG REGARDING ASSOCIATED FILE INFORMATION |
|---|
| ASSOCIATED AUDIO FILE |

| F. TAG REGARDING DATE AND TIME |
|---|
| DATE AND TIME OF ORIGINAL PICTURE DATA GENERATED |
| DATE AND TIME OF DIGITAL DATA CREATED |
| SUBSEC FOR Date Time |
| SUBSEC FOR Date TimeOriginal |
| SUBSEC FOR Date TimeDigitized |

| G. TAG REGARDING SHOOTING CONDITION |
|---|
| SEE RIGHT TABLE |

| H. POINTER TO IFD |
|---|
| POINTER TO COMPATIBLE IFD |

| MANUFACTURER'S NOTE |
|---|
| FILM ID |
| FRAME ORDER DETERMINED YES/NO |

| G. TAG REGARDING SHOOTING CONDITION |
|---|
| EXPOSURE PERIOD |
| F NUMBER |
| EXPOSURE PROGRAM |
| SPECTRUM SENSITIVITY |
| ISO SPEED RATE |
| OPTOELECTRONIC TRANSUDING FUNCTION |
| SHUTTER SPEED |
| STOP VALUE |
| BRIGHTNESS VALUE |
| EXPOSURE CORRECTION VALUE |
| LENS MINIMUM F VALUE |
| DISTANCE TO OBJECT |
| METERING METHOD |
| LIGHT SOURCE |
| FLASH |
| LENS FOCAL LENGTH |
| FLASH STRENGTH |
| SPACE FREQUENCY RESPONSE |
| RESOLUTION OF WIDTH OF FOCAL PLANE |
| RESOLUTION OF HEIGHT OF FOCAL PLANE |
| RESOLUTION UNIT FOR FOCAL PLANE |
| POSITION OF OBJECT |
| EXPOSURE INDEX |
| SENSOR METHOD |
| FILE SOURCE |
| SCENE TYPE |
| CFA PATTERN |

FIG.5

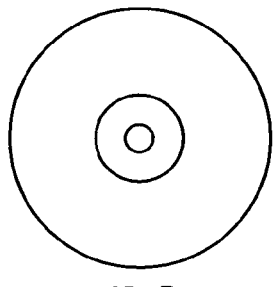

CD-R

| FILE NAME (FRAME NUMBER) | FILM ID | FRAME ORDER DETERMINED |
|---|---|---|
| DSCF0001 | FILM0001 | YES |
| DSCF0002 | FILM0001 | YES |
| DSCF0003 | FILM0001 | YES |
| DSCF0004 | FILM0001 | YES |
| DSCF0005 | FILM0001 | YES |
| DSCF0006 | FILM0001 | YES |
| DSCF0007 | FILM0001 | YES |
| DSCF0008 | FILM0001 | YES |
| DSCF0009 | FILM0001 | YES |
| DSCF0010 | FILM0001 | YES |
| DSCF0011 | FILM0001 | YES |
| DSCF0012 | FILM0001 | YES |
| DSCF0013 | FILM0001 | YES |
| DSCF0014 | FILM0001 | YES |
| DSCF0015 | FILM0001 | YES |
| DSCF0016 | FILM0001 | YES |
| DSCF0017 | FILM0001 | YES |
| DSCF0018 | FILM0001 | YES |
| DSCF0019 | FILM0001 | YES |
| DSCF0020 | FILM0001 | YES |
| DSCF0021 | FILM0001 | YES |
| DSCF0022 | FILM0001 | YES |
| DSCF0023 | FILM0001 | YES |
| DSCF0024 | FILM0001 | YES |
| DSCF0025 | FILM0001 | YES |
| DSCF0026 | FILM0002 | NO |
| DSCF0027 | FILM0002 | NO |
| DSCF0028 | FILM0002 | NO |
| ⋮ | ⋮ | ⋮ |
| DSCF0100 | FILM0006 | YES |
| DSCF0101 | FILM0006 | YES |
| DSCF0102 | FILM0006 | YES |
| DSCF0103 | FILM0006 | YES |
| DSCF0104 | FILM0006 | YES |
| DSCF0105 | FILM0006 | YES |
| DSCF0106 | FILM0006 | YES |

| | BEFORE REPLACEMENT | | | AFTER REPLACEMENT |
|---|---|---|---|---|
| | FILE NAME (FRAME NUMBER) | | | FILE NAME (FRAME NUMBER) |
| A | DSCF0034 | | A | DSCF0057 |
| B | DSCF0035 | | B | DSCF0056 |
| C | DSCF0036 | | C | DSCF0054 |
| D | DSCF0037 | | D | DSCF0053 |
| E | DSCF0038 | | E | DSCF0052 |
| F | DSCF0039 | | F | DSCF0050 |
| G | DSCF0040 | | G | DSCF0049 |
| H | DSCF0041 | | H | DSCF0048 |
| I | DSCF0042 |  | I | DSCF0047 |
| J | DSCF0043 | | J | DSCF0046 |
| K | DSCF0044 | | K | DSCF0045 |
| L | DSCF0045 | | L | DSCF0044 |
| M | DSCF0046 | | M | DSCF0043 |
| N | DSCF0047 | | N | DSCF0042 |
| O | DSCF0048 | | O | DSCF0041 |
| P | DSCF0049 | | P | DSCF0040 |
| Q | DSCF0050 | | Q | DSCF0039 |
| R | DSCF0052 | | R | DSCF0038 |
| S | DSCF0053 | | S | DSCF0037 |
| T | DSCF0054 | | T | DSCF0036 |
| U | DSCF0056 | | U | DSCF0035 |
| V | DSCF0057 | | V | DSCF0034 |

FIG.18

| FILE NAME (FRAME NUMBER) | INFORMATION ON DATE AND TIME OF THE PICTURE TAKEN |
|---|---|
| DSCF0034 | 2004.01.01 00:00:00 |
| DSCF0035 | 2004.01.01 00:10:00 |
| DSCF0036 | 2004.01.01 00:20:00 |
| DSCF0037 | 2004.01.01 00:30:00 |
| DSCF0038 | 2004.01.01 00:40:00 |
| DSCF0039 | 2004.01.01 00:50:00 |
| DSCF0040 | 2004.01.01 01:00:00 |
| DSCF0041 | 2004.01.01 01:10:00 |
| DSCF0042 | 2004.01.01 01:20:00 |
| DSCF0043 | 2004.01.01 01:30:00 |
| DSCF0044 | 2004.01.01 01:40:00 |
| DSCF0045 | 2004.01.01 01:50:00 |
| DSCF0046 | 2004.01.01 02:00:00 |
| DSCF0047 | 2004.01.01 02:10:00 |
| DSCF0048 | 2004.01.01 02:20:00 |
| DSCF0049 | 2004.01.01 02:30:00 |
| DSCF0050 | 2004.01.01 02:40:00 |
| DSCF0052 | 2004.01.01 03:00:00 |
| DSCF0053 | 2004.01.01 03:10:00 |
| DSCF0054 | 2004.01.01 03:20:00 |
| DSCF0056 | 2004.01.01 03:30:00 |
| DSCF0057 | 2004.01.01 03:40:00 |

CONDITION SET

| DATE AND TIME OF THE PICTURE TAKEN | 2004.01.01 00:00:00 |
|---|---|
| DIFFERENCE | 00:10:00 |

FILM DIGITIZE DEVICE AND PICTURE MANAGEMENT PROGRAM

BACKGROUND OF THE INVENTION

1. Field of the Invention

The present invention relates to a film digitize device and a picture management program, and specifically to a film digitize device and a picture management program for converting a picture recorded on a film into digital picture data and managing the converted picture data.

2. Related Art

A photo shop or the like provides a service for digitizing a picture taken with a film camera and recording the digital data on a recording medium such as CD-R. Usually, pictures are read out from the top frame of a film in order, digitized and written on CD-R in this service.

A film camera employs two ways of taking pictures; the normal wind method for taking pictures with winding the film frame by frame, and the pre-wind method for taking pictures with the film rolled up to a spool when the film is loaded and rewinding the film frame by frame to a cartridge. If a film with pictures taken by a camera in the pre-wind method is subject to the above mentioned writing service, the order the pictures taken-on the-film is reversed on CD-R. This is a problem.

The method for determining the direction of a film wound as pictures taken based on wind information recorded on a magnetic recording layer on an APS (Advanced Photo System) film, reading the pictures in the order they were taken, and writing the pictures on a CD-R is proposed in Japanese Patent Application Laid-open No. 8-286291.

The method for determining the direction of a film wound as pictures taken based on the fames numbers recorded on a magnetic recording layer on an APS film, and displaying the pictures in the order they were taken is proposed in Japanese Patent Application Laid-open No. 7-307894.

SUMMARY OF THE INVENTION

However, the methods proposed in Japanese Patent Application Laid-open Nos. 8-286291 and 7-307894 have a problem in that they cannot be applied to 135 film that has no magnetic recording layer.

The present invention is adapted in view of this situation. The object of the present invention is to provide a film digitize device and a picture management program that enable easy management of picture data digitized from a film.

In order to achieve the object, the first aspect of the present invention provides a film digitize device for reading pictures recorded on a film in order starting at the top frame of the film, converting the pictures into pieces of digital picture data frame by frame, and recording the pieces of the digital picture data along with frame numbers in the order the pictures read on a recording medium, comprising a record controlling device which records a series of picture data pieces read from the same film along with information of the same film ID.

According to the first aspect, the picture data pieces read from the same film are recorded on a recording medium along with information of the same film ID. This enables the film digitize device to easily extract picture data pieces read from the same film by reading information of film ID given to the picture data pieces when the device capture the picture data pieces recorded on a recording medium, for example, into a personal computer for management. If extracted picture files come with frame numbers in the reverse order of the pictures taken, the film digitize device can rearrange the frame numbers in the order the pictures taken by reversing the frame numbers in block.

In order to achieve the object, the second aspect of the present invention provides the film digitize device according to the first aspect, further comprising a wind information reading device reads wind information added to a film, wherein picture data pieces are recorded on a recording medium along with the frame numbers in the order the pictures taken based on wind information read by the wind information reading device.

According to the second aspect, the picture data pieces are recorded on a recording medium along with information of film ID and wind information when the film records wind information indicating the direction of film wound as pictures taken. This enables the film digitize device to easily recognize picture data pieces read from the same film as well as the direction of the film wound as pictures taken.

In order to achieve the object, the third aspect of the present invention provides the film digitize device according to the second aspect, wherein the record controlling device records picture data pieces on a recording medium along with the information of film ID and information whether or not the frame numbers are given to the picture data pieces in the order the pictures taken.

According to the third aspect, the picture data pieces are recorded on a recording medium along with information of film ID and information whether or not the frame numbers are given to the picture data pieces in the order the pictures taken. This enables the film digitize device to handle picture data pieces based on the presence of frame order determining information for efficient processing.

In order to achieve the object, the fourth aspect of the present invention provides a picture management program for managing picture data pieces read from a film with the film digitize device according to the aspects from the first to the third, wherein the program causes a computer to operate the functions of accepting an indication of extracting picture data pieces along with information of the same film ID and extracting a series of picture data pieces along with information of the same film ID according to the indication of extracting picture data pieces.

According to the fourth aspect, the computer extracts a series of data along with information on the same film ID in response to an indication of extracting picture data pieces. This enables a user to handle picture files read from the same film in block. For example, a user can copy or move picture files to another folder in block.

In order to achieve the object, the fifth aspect of the present invention provides the picture management program according to the fourth aspect for causing a computer to operate the functions of displaying thumbnail pictures of an extracted series of picture data pieces in the order of the frame numbers on a display device, accepting an indication of replacing the frame numbers for the extracted series of picture data pieces, and replacing the frame numbers of the extracted series of picture data pieces so that the order of thumbnail pictures displayed on the display device is reversed according to the indication of replacing the frame numbers.

According to the fifth aspect, thumbnail pictures of the extracted picture files are displayed on the display device in the order of the frame numbers. When the indication of replacing the frame numbers is issued, the frame numbers of the extracted series of picture data pieces are replaced with other numbers so that the order of thumbnail pictures displayed on the display device is reversed.

In order to achieve the object, the sixth aspect of the present invention provides the picture management program according to the fourth or fifth aspect for causing the computer to operate a function of adding information on specified date and time the picture taken to the extracted series of picture data pieces.

According to the sixth aspect, information on specified date and time the picture taken can be added to a series of picture data pieces extracted according to the indication of extracting picture data pieces.

In order to achieve the object, the seventh aspect of the present invention provides the picture management program according to the sixth aspect for causing the computer to operate a function of adding information on date and time the picture taken to the extracted series of picture data pieces with a specified difference shifted in the order of frame numbers.

According to the seventh aspect, information on date and time the picture taken can be added to the extracted series of picture data pieces with a specified difference shifted in the order of frame numbers. This enables the computer to arrange picture data pieces in the order of the date and time the pictures taken.

According to the present invention, picture data digitized from a film can be easily managed.

BRIEF DESCRIPTION OF THE DRAWINGS

FIG. 4 is a schematic view of additional information added to Exif file;

FIG. 5 is a schematic view of a picture file;

FIG. 18 is a conceptual diagram of a process of adding date and time of the picture taken with a difference;

DETAILED DESCRIPTION OF THE PREFERRED EMBODIMENT

A preferred embodiment for implementing a film digitize device and a picture management program according to the present invention will be described with reference to the attached figures.

Figure 1:
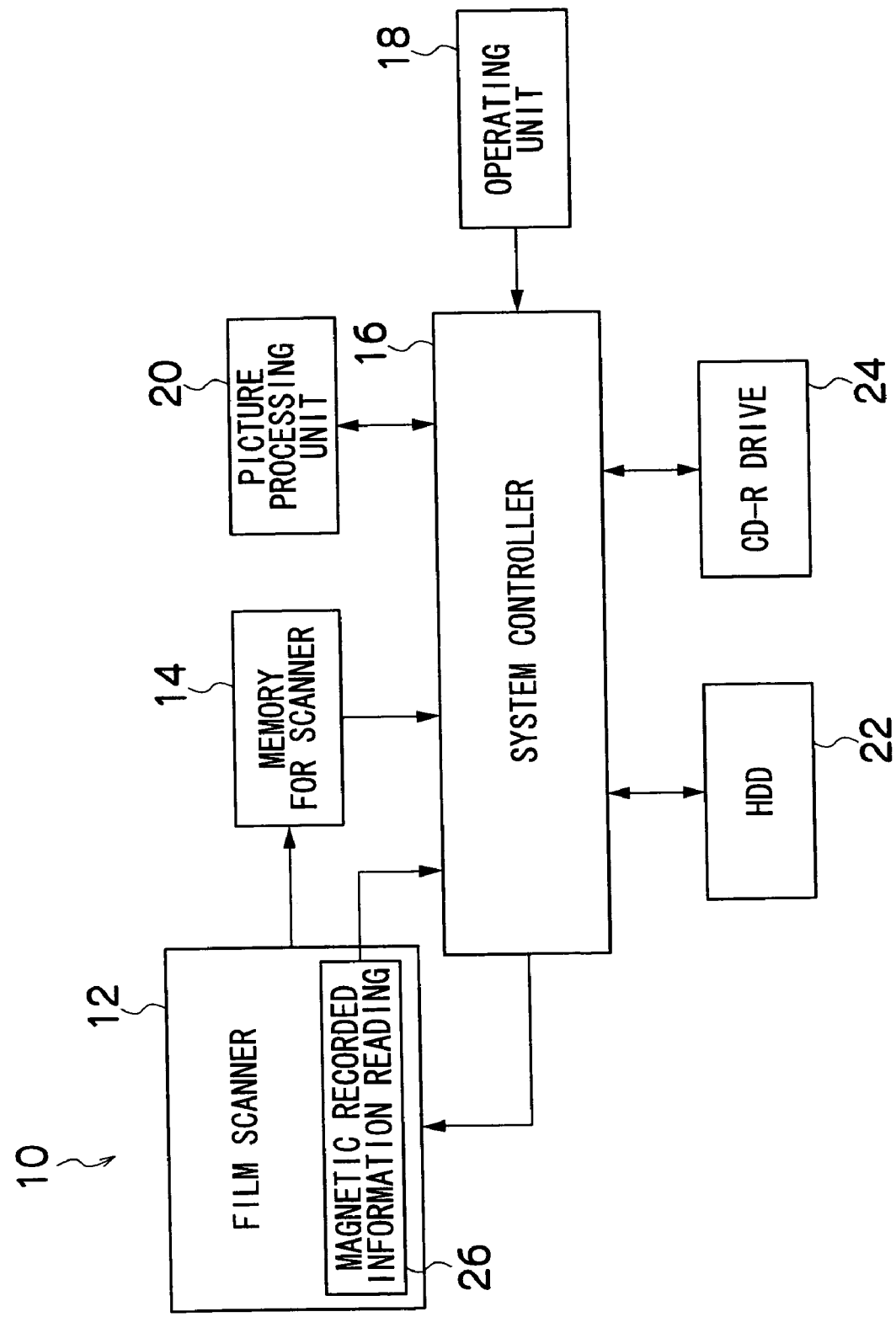
FIG. 1 is a block diagram illustrating an embodiment of a film digitize device according to the present invention.

FIG. 1 is a block diagram illustrating an embodiment of a film digitize device according to the present invention. As shown in the figure, film digitize device 10 includes film scanner 12, memory for scanner 14, system controller 16, operating unit 18, picture processing unit 20, hard disk drive (HDD) 22, CD-R drive 24, and the like.

Film scanner 12 reads a picture from a developed film that is set, and outputs the read picture as a digital picture signal to memory for scanner 14. Film scanner 12 is adapted to read a picture from a various types of film including APS film, 135 film, and Brownie film.

The APS film is set to the device as it is contained in a film cartridge, and the device reads the pictures. The 135 film is set to the device with the edge of the film role drawn out from the film cartridge or with the film role divided into pieces, and the device reads the pictures. The Brownie film is set to the device as a film role or with the film role divided into pieces, and the device reads the pictures.

Film scanner 12 includes magnetic recorded information reading device 26 for reading magnetic recorded information recorded on a magnetic recording layer of the APS film. The magnetic recorded information includes wind information indicating the direction of the film wound as pictures taken. The read magnetic recorded information is output to system controller 14.

System controller 16 includes CPU, ROM, RAM and the like. System controller 16 controls the operation over a film digitize device according to a predetermined program based on indication from operating unit 18.

The digital picture signal output from film scanner 12 is captured in memory for scanner 14 and then added to picture processing unit 20. Picture processing unit 20 generates picture data by applying a required signal processing to the input picture signal according to a command from system controller 16.

The picture data generated at picture processing unit 20 is made into a picture file according to a predetermined format (for example, Exif format) by system controller 16. The picture file is stored on HDD 22 along with a predetermined film name. Then, the picture file stored in HDD 22 is sent to CD-R drive 24 according to a command from system controller 16 and written on CD-R via CD-R drive 24.

Figure 2:
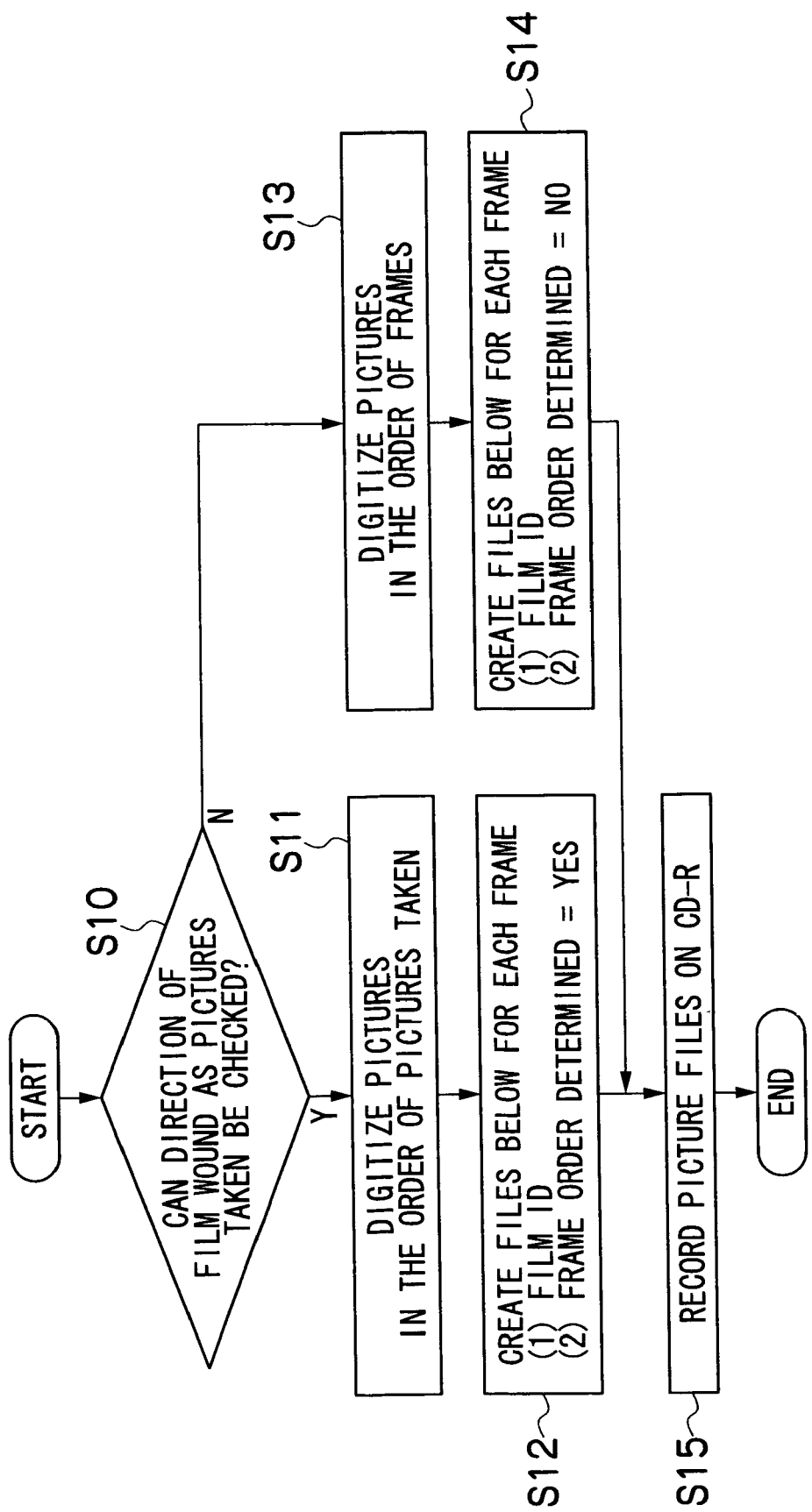
FIG. 2 is a flowchart showing a procedure of film digitizing with a film digitize device.

FIG. 2 is a flowchart showing a procedure of film digitize processing in a film digitize device 10 according to the embodiment.

When a film to be processed is set to film scanner 12, system controller 16 determines whether the direction of the film wound as pictures taken can be checked or not (step S10). System controller 16 determines this on the basis of magnetic recorded information read by magnetic recorded information reading device 26. Therefore, the direction of the film wound as pictures taken can only be checked for the APS film. For films other than APS film, system controller 16 determines that the direction of the film wound as pictures taken cannot be checked. System controller 16 also determines that the direction of the film wound as pictures taken cannot be checked even for the APS film if the magnetic recorded information does not include wind information.

When system controller 16 determines that the direction of the film wound as pictures taken can be checked, it digitizes the pictures recorded on the film set to the device in the order of the pictures taken (step S11). In other words, system controller 16 makes film scanner 12 read the pictures in the order of the pictures taken and makes picture processing unit 20 generate picture data in the order of the pictures read.

The generated picture data pieces are made into picture files in a predetermined format (here, Exif) at system controller 16 and stored on HDD 22. At this moment, system controller 16 stores the picture files on HDD 22 along with frame numbers in the order of the pictures read. The frame numbers are added as a part of the file name.

For example, the file name "DSCF0001" is given to a picture file of the first read picture as a file name. The figure part other than the leading four alphabets, i.e., "0001" in this example, is the frame number. The file name "DSCF0002" is given to a picture file of the secondly read picture as a file name. In this case, the frame number is "0002".

System controller 16 stores picture files on HDD 22, with information of film ID and information on the presence of the frame order added to each of the file (step S12).

Information on film ID is the information identifying a picture file read from the same film. For example, information of "FILM0001" is added to a picture file read from the same film. An operator inputs the film ID from operating unit 18 when the film is set to film scanner 12. Or, system controller 16 automatically gives the film ID when the film is set.

Information on the presence of the frame order is the information indicating whether the picture files are recorded along with the frame numbers in the order of the pictures taken. Information of "frame order determined=YES" is added to the picture files recorded along with frame numbers in the order of the pictures taken. Information of "frame order determined=NO" is added to the picture files that are unknown whether they are recorded along with frame numbers in the order of the pictures taken.

If it is determined that the direction of the film wound as pictures taken can be checked at step 10, pictures are read in the order of the pictures taken. Thus, information "frame order determined=YES" is added.

Information of film ID and information on the presence of the frame order are recorded in additional information of Eixf file, for example.

Figure 3:
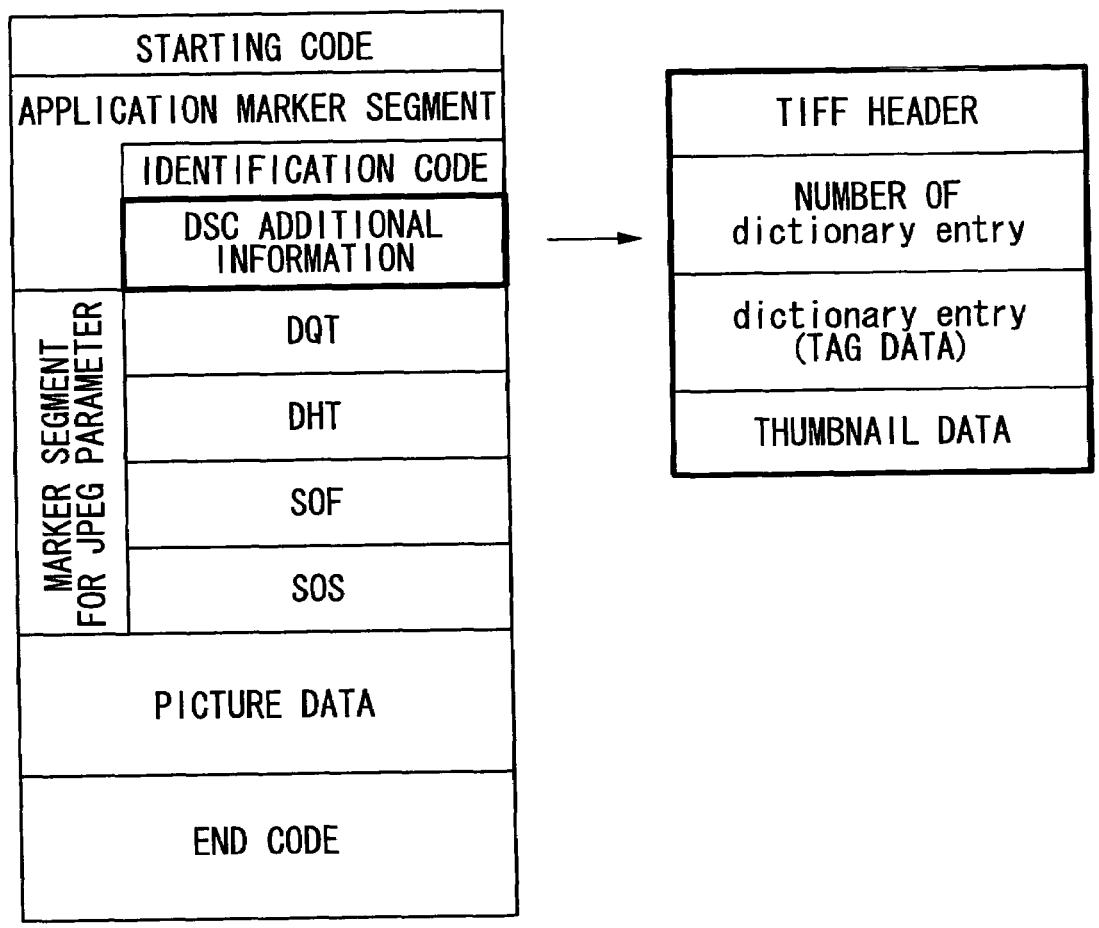
FIG. 3 is a schematic view of Exif file.

Exif file is adapted that additional information can be recorded on a header part of a picture file in a tag format, as shown in FIG. 3. On the additional information tag, shooting data on picture taken including information on version or characteristics of picture data, information on the configuration, user information, associated file information, information on date and time, information on a shooting condition, information on pointer for IFD is recorded in a tag format as shown in FIG. 4.

The manufacturer's note, which is a tag to user information, is designed for a manufacturer to fill in its own information. The user comment is designed for a user to write a keyword or comments. Information of film ID and information of the frames order determined YES/NO are written in the user comment area in the Eixf file of film digitize device 10 according to the embodiment.

If it is determined that the direction of the film wound as pictures taken can be checked at step 10, pictures are read in the order the pictures taken and stored on HDD 22 with frame numbers given to each of the picture files in the order the pictures are read.

If it is determined that the direction of the film wound as pictures taken cannot be checked at step 10, system controller 16 digitizes the pictures recorded on the film set to the device in the order of frames, i.e., frame by frame starting at the top frame (step S13). Then system controller 16 stores the picture files on HDD 22 along with frame numbers in the order of the pictures read. At this moment, system controller 16 stores the read picture files, with information of film ID and information of frame order determined=NO is added to each of the files (step S14).

When the direction of the film wound as pictures taken can be checked, film digitize device 10 digitizes pictures in the order the pictures taken. When the direction of the film wound as pictures taken cannot be checked, film digitize device 10 digitizes pictures frame by frame starting at the top frame. Then film digitize device 10 stores the picture files on HDD 22 along with frame numbers in the order the pictures read. If film digitize device 10 reads pictures in the order of the pictures taken, it stores the picture files on HDD 22, with information of frame order determined=YES added to each of the picture files. If film digitize device 10 reads pictures frame by frame starting at the top frame, it stores the picture files on HDD 22, with information of frame order determined=NO added to each of the picture files. Picture files read from the same film are recorded on HDD 22 along with information of the same film ID.

When a predetermined number of picture files have been read, system controller 16 makes picture files stored on HDD 22 to be recorded on CD-R by outputting a command to CD-R drive 24 (step S15).

As mentioned above, pictures recorded on a film are digitized and recorded on a CD-R as digital picture data.

As described above, film digitize device 10 according to the embodiment records picture files read from a film on a CD-R along with information of film ID for identifying a picture file read from the same film and information on the presence of frame order determination indicating whether or not the frame numbers are given in the order the pictures taken (see FIG. 5). Therefore, a user who handles a picture file stored on a CD-R can easily manage the picture files stored on the CD-R by reading the information added to each of the picture files.

For example, film digitize device 10 can easily identify a series of picture films read out from the same film by extracting picture files with information of the same film ID. If the frame order of a series of extracted picture files is not determined, an operator can recognize whether or not the frame numbers are given to the files in the order the pictures taken (whether the files are read in the order the pictures taken) at a glance by listing a series of extracted picture files arranged in the order of the frame numbers. If the frame numbers are not given to the films in the order the pictures taken, an operator can replace the frame numbers with new frame numbers given in the order the pictures taken by reversing the original frame numbers in block.

A picture management program for managing a picture file read out from a film with the above mentioned film digitize device 10 will be described.

Figure 6:
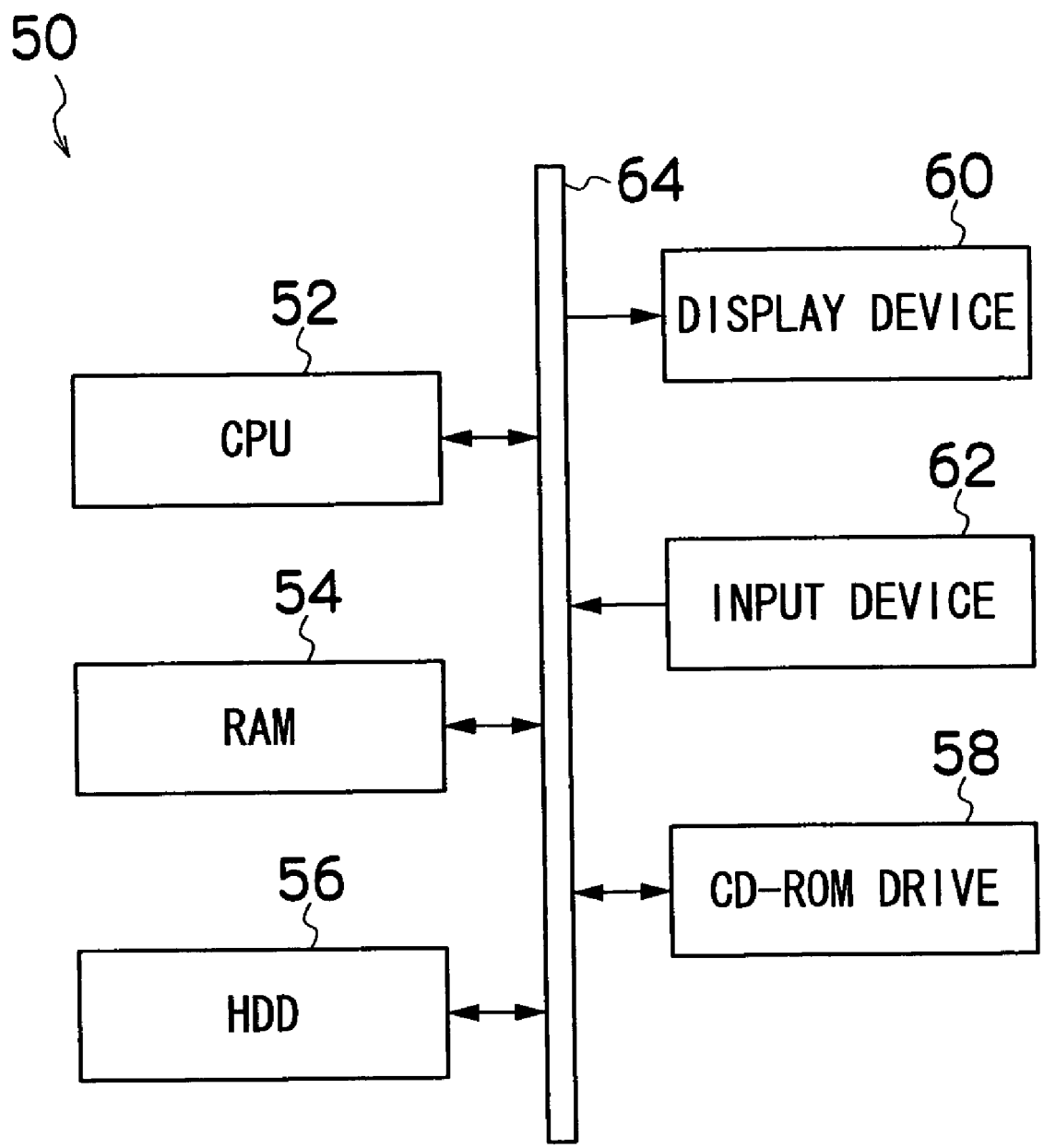
FIG. 6 is a block diagram illustrating an exemplary configuration of hardware of a computer.

FIG. 6 is a block diagram illustrating an exemplary configuration of hardware of a computer (personal computer) for executing the picture management program according to the embodiment.

Personal computer 50, which is a general purpose computer, includes central processing unit (CPU) 52 for executing the picture sorting program according to the embodiment, RAM 54 for temporally storing a calculation result, picture data or the like from CPU 52, an operating system (OS) or a picture sorting program according to the present invention, various application programs, hard disk drive (HDD) 56 for storing picture files and the like, CD-ROM drive 58 for reading data stored on CD-ROM, display device 56 for displaying a calculation result or picture data from CPU 60, input device 62 such as a keyboard or a mouse for inputting a command, figures and the like, which are interconnected via bus 64.

A picture file read from a film and read on a CD-R by film digitize device 10 is read out from CD-ROM drive 58 and stored on HDD 56.

The picture management program according to the embodiment is installed on HDD 56 of the above mentioned personal computer 50, loaded from HDD 56 on RAM 54, and controlled by CPU 52. The program can be executed after read from a CD-ROM via CD-ROM drive 58 or the like or downloaded from a network.

The picture management program according to the embodiment includes a function for managing a picture file and for viewing a picture file.

Figure 7:
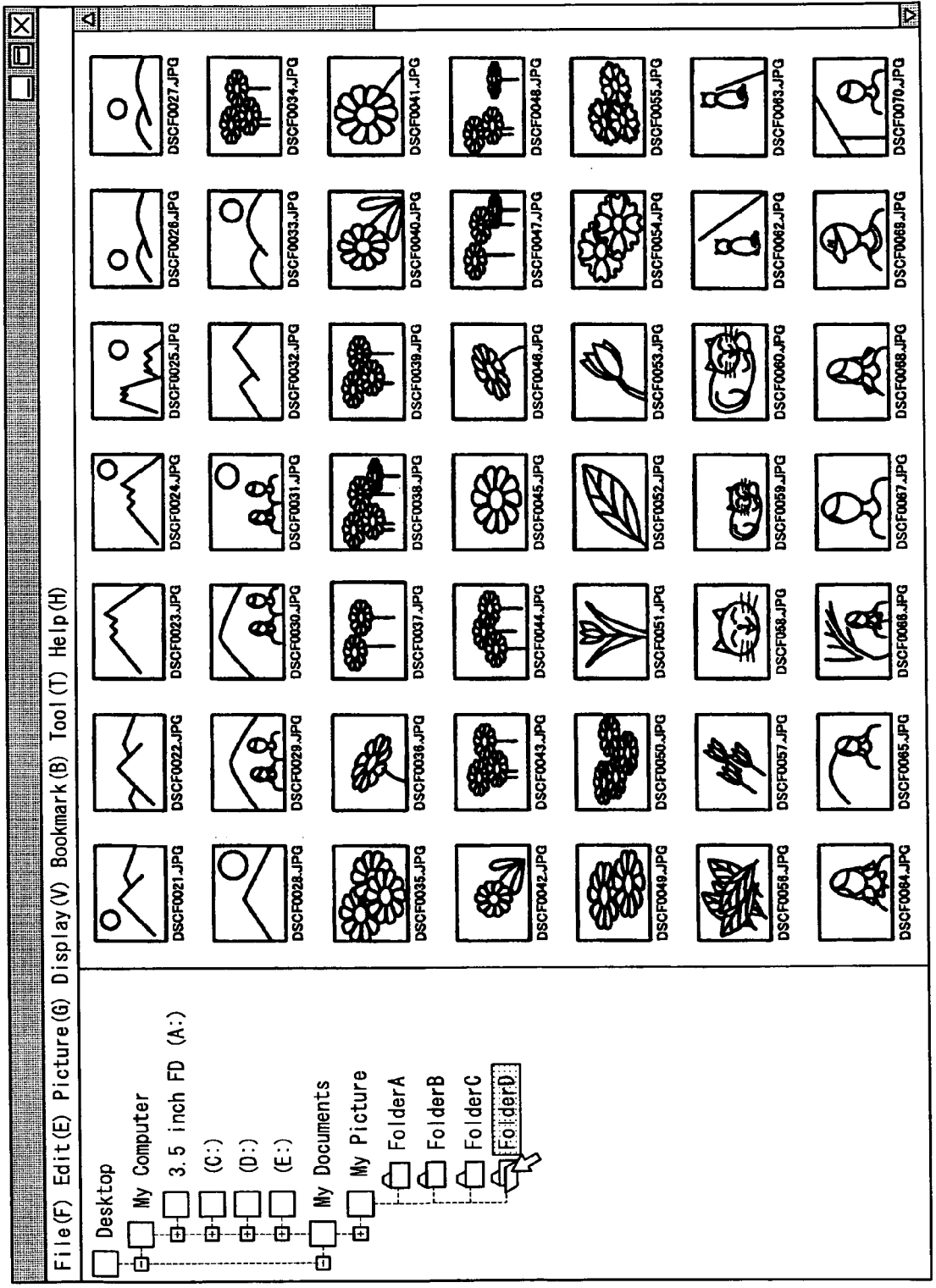
FIG. 7 is a diagram showing a main window of a picture management program according to the embodiment.

FIG. 7 shows a main window of a picture management program according to the embodiment. When the program starts, the main window shown in the figure appears on display device 60.

The main window includes a folder tree display region displayed on the left part of the screen and a thumbnail display region displayed on the right part of the screen.

In the folder tree display region, folders in personal computer 50 are displayed in hierarchical fashion. When a folder displayed in the folder tree display region is selected, picture files stored in the selected folder are listed in a thumbnail form in the thumbnail display region.

If the selected folder contains no picture file, the thumbnail display region displays nothing. If the selected folder further contains folders, folder icons are listed in the thumbnail display region.

When a picture file is selected (double clicked) from the picture files listed in a thumbnail form in the thumbnail display region, the selected picture file is zoomed up in another window.

When a slide show function is executed, picture files stored in the selected folder are automatically displayed with a certain period of frame-advance.

A picture management program according to the embodiment includes a function of extracting a series of picture files read from the same film, a function of replacing the file names (frame numbers) with new file names in block for the extracted series of picture files, a function of writing information on date and time the pictures taken on the extracted series of picture files, and the like.

First, a function of extracting a series of picture files read from the same film will be described.

Figure 8:
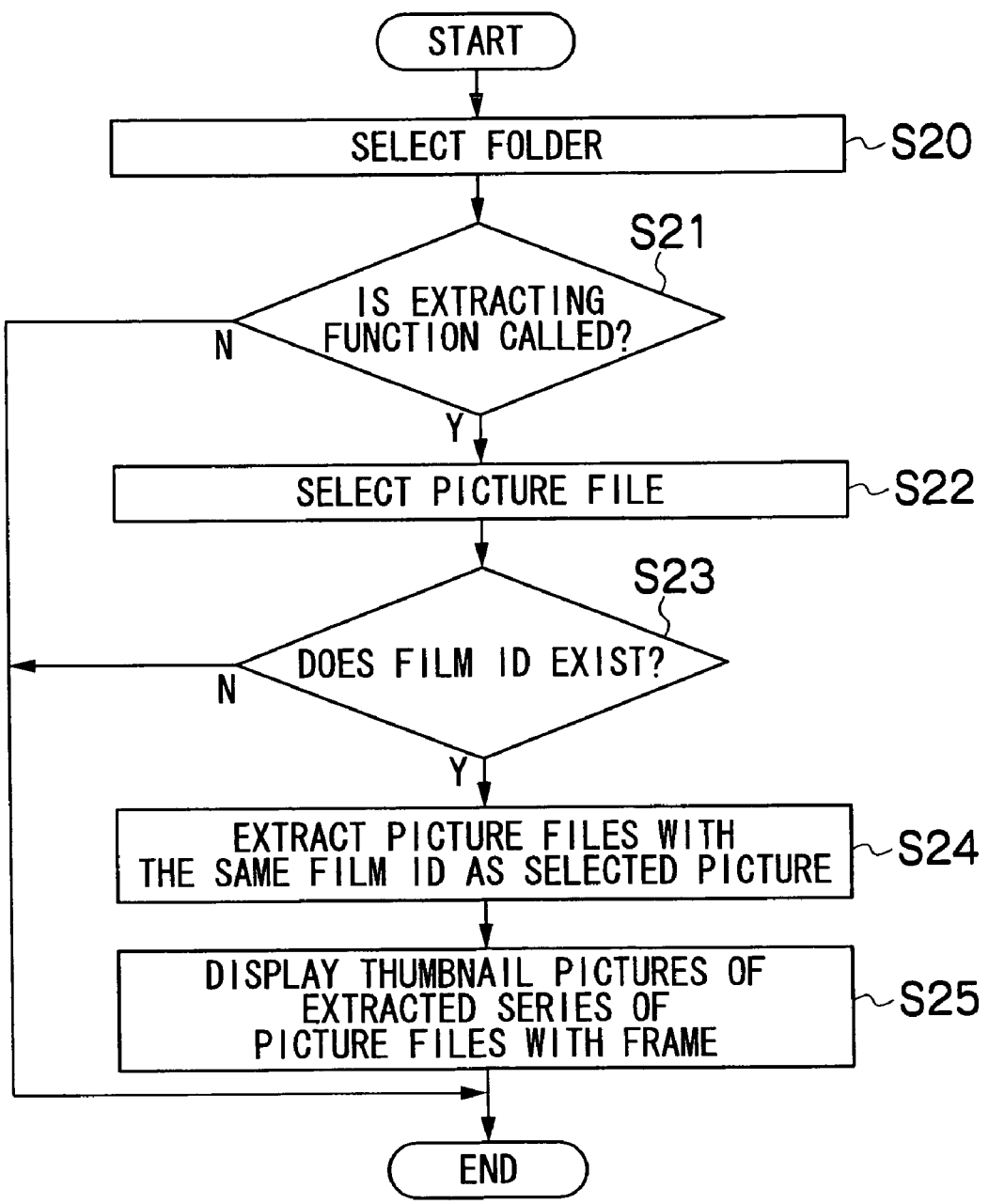
FIG. 8 is a flowchart showing a procedure of a process of extracting picture files.

FIG. 8 is a flowchart showing a procedure of extracting a series of picture files read from the same film.

A user selects a folder storing a group of picture files that the user wants to extract (step S20). Folders are selected on the folder tree display region. In other words, a user selects a folder by selecting (single clicking on) a folder to be sorted with a mouse pointer from folders displayed in the folder tree display region. When a folder to be sorted is selected with a mouse pointer, CPU 52 lists thumbnail pictures of picture files stored in the selected folder in the thumbnail display region in the order of the frame numbers (in the order of frame numbers contained in a file name). FIG. 7 shows the case that "FolderD" is selected.

Figure 9:
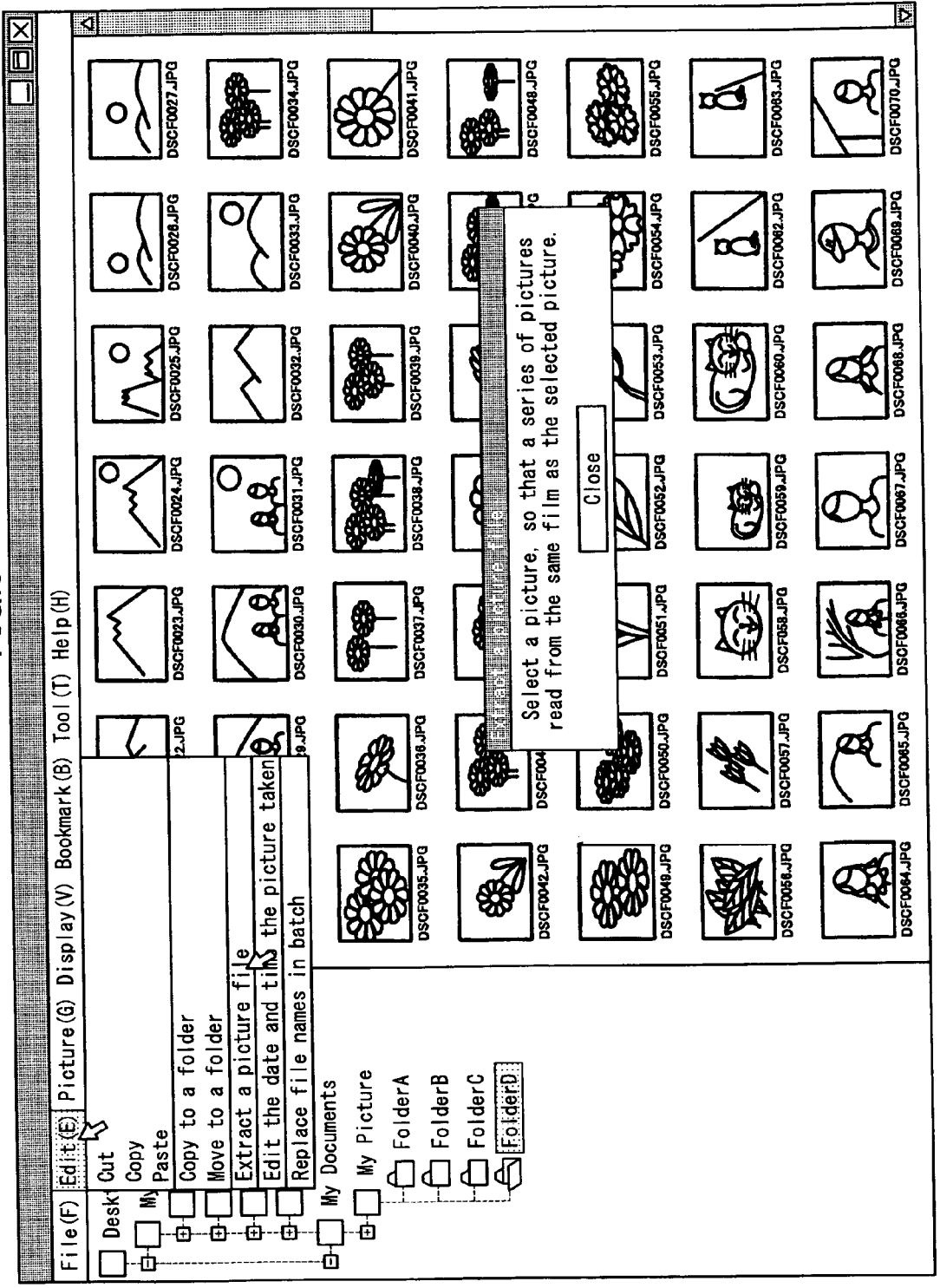
FIG. 9 is a diagram showing an example of a main window displayed during a process of extracting picture files.

Then, the user calls a function of extracting a picture file read from the same film from a group of picture files stored in the selected folder. The function of extracting a picture file is called by selecting "edit" from a menu displayed on the tool bar and selecting "extract a picture file" from the "edit" menu, as shown in FIG. 9. CPU 52 determines whether or not the function "extract a picture file" is called (step S21). When CPU 52 detects that the function "extract a picture file" is called, it executes a picture file extraction described below.

A picture file is extracted by extracting a picture file with the same film ID as that of a picture file selected from picture files listed in the thumbnail display region. Therefore, a picture file has to be selected first.

When the function "extract a picture file" is executed, CPU 52 pops up a dialog box showing a message inviting a user to select a picture ("A series of pictures read from the same film as that of the selected picture. Select a picture.") on display device 60, as shown in FIG. 9. A user selects a picture file based on the message shown in this pop-up dialog box (step S22). A user selects a picture file by selecting (single clicking on) a thumbnail picture with a mouse pointer among the thumbnail pictures listed in the thumbnail display region.

CPU 52 determines whether a picture file of the selected thumbnail picture has a film ID or not (step S23). When the picture file has a film ID, CPU 52 reads information of the film ID. Then CPU 52 extracts picture files with the same film ID as the read film ID from the selected folder (step S24).

If the selected picture file has no information of film ID, CPU 52 does not perform an extraction and exits the process.

CPU 52 displays thumbnail pictures of an extracted series of picture files with an identification mark (in a frame) on display device 60 (step S25).

If a picture file with a file name "DSCF0055. JPG" is selected from picture files displayed in the thumbnail display region in the example shown in FIG. 9, a film ID is read from the selected picture file "DSCF0055. JPG" and a picture file with the same film ID as the film ID of the selected file is searched.

If picture files with the same film ID as that of the picture file "DSCF0055. JPG" are "DSCF0034. JPG"-"DSCF0057. JPG", the thumbnail pictures of picture files from "DSCF0034. JPG"-"DSCF0057. JPG" are displayed in the thumbnail display region, enclosed in a frame.

When a function of extracting picture files is executed, a series of picture files with the same film ID as that of the selected picture file, i.e., a series of picture files read from the same film are extracted.

Next, a function of replacing the file names (frame numbers) with new file names in block for the extracted series of picture files will be described.

A function of replacing the file names with new file names in block is a function of reversing the order of the frame numbers given to the file names in block. This function is employed when the frame numbers are not given to the file names in the order the pictures taken. The function of replacing the file names with new file names in block is performed on a group of the extracted series of picture files extracted with the above mentioned function of extracting picture files.

Figure 11:
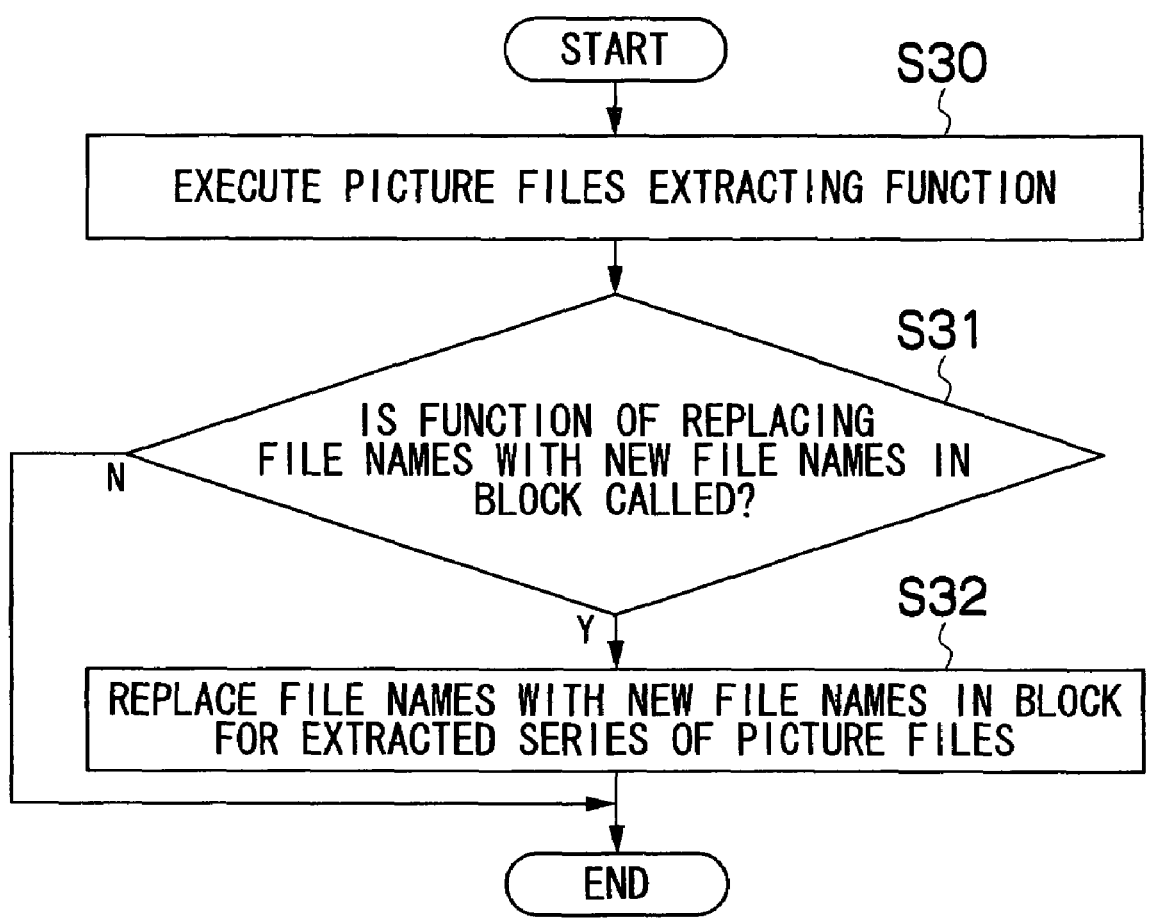
FIG. 11 is a flowchart showing a procedure of a process of replacing the file names with new file names in block.
Figure 12:
FIG. 12 is a conceptual diagram of a process of replacing the file names with new file names in block.

FIG. 11 is a flowchart showing a procedure of replacing the file names with new file names in block. When the process of replacing the file names with new file names in block is executed after the above mentioned process of extracting picture files, the function of replacing the file names with new file names in block is called. The function of replacing the file names with new file names in block is called by selecting "edit" from a menu displayed on the tool bar and selecting "replace the file names with new file names in block" from "edit" menu (see FIG. 9).

After executing the above mentioned process of extracting picture files (step S30), CPU 52 determines whether the function of "replacing the file names with new file names in block" is called or not (step S31). When CPU 52 detects that the function of "replacing the file names with new file names in block" is called, it executes the next process of replacing the file names with new file names in block. That is to say, CPU 52 reverses the order of the frame numbers given to file names of the extracted series of picture files.

Figure 10:
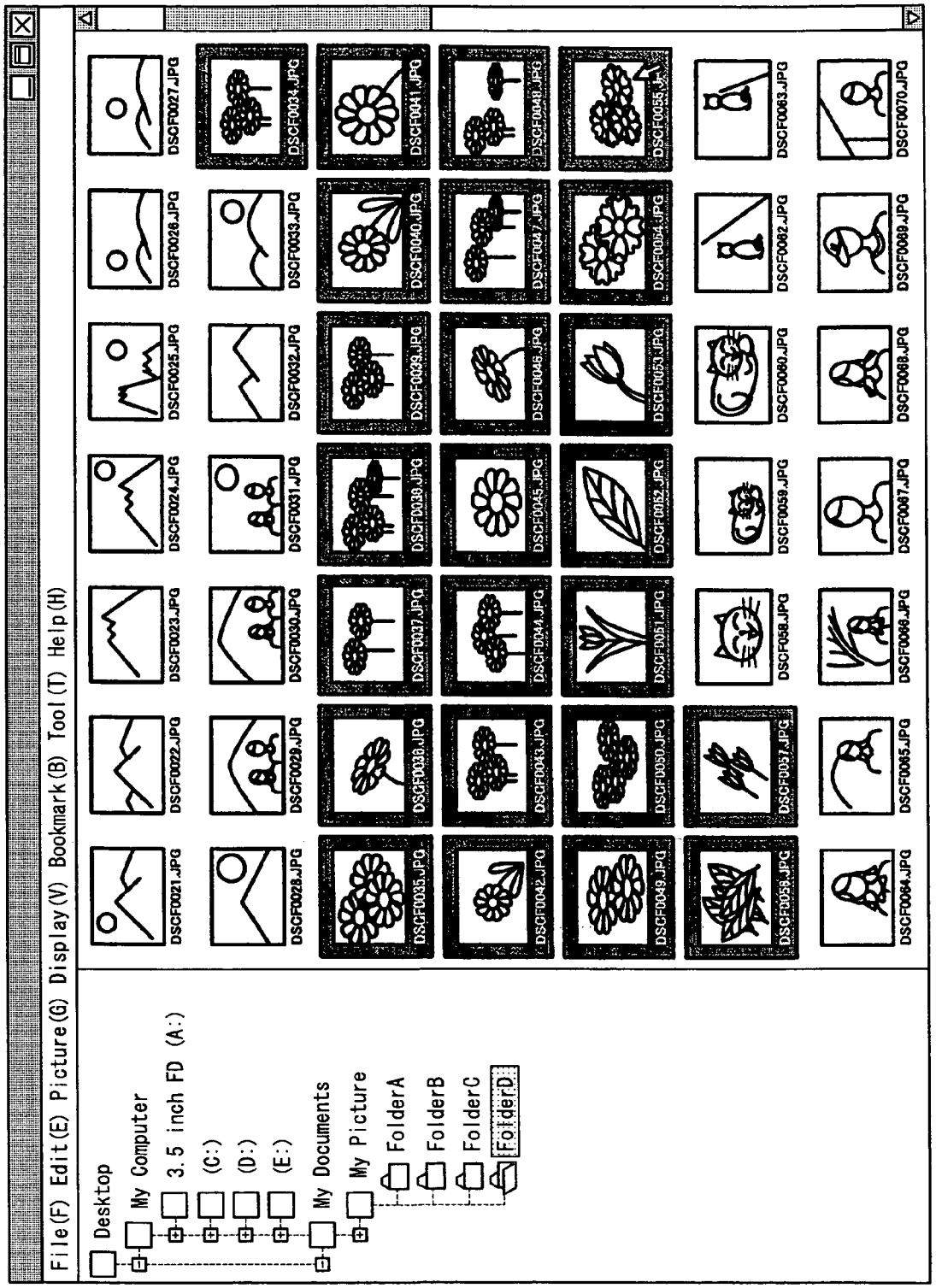
FIG. 10 is a diagram showing an example of a main window displayed after a process of extracting picture files.

It is assumed that "DSCF0034. JPG"-"DSCF0057. JPG" are extracted as a group of picture files read from the same film (a group of picture files with the same film ID) as shown in FIG. 10, as a result of extracting picture files.

In this case, if the process of replacing the file names with new file names in block is executed, the file name of picture file (A) of the original file name "DSCF0034. JPG" is replaced with the file name "DSCF0057. JPG". The file name of picture file (V) of the original file name "DSCF0057. JPG" is replaced with the file name "DSCF0034. JPG". Similarly, the file name of the picture file (B) of the original file name "DSCF0035. JPG" is replaced with the file name "DSCF0056. JPG" and the file name of picture file (V) of the original file name "DSCF0056. JPG" is replaced with the file name "DSCF0035. JPG".

When the process of replacing the file names with new file names in block is executed, the part of frame numbers contained in file names of the extracted series of picture files is reversed.

Figure 13:
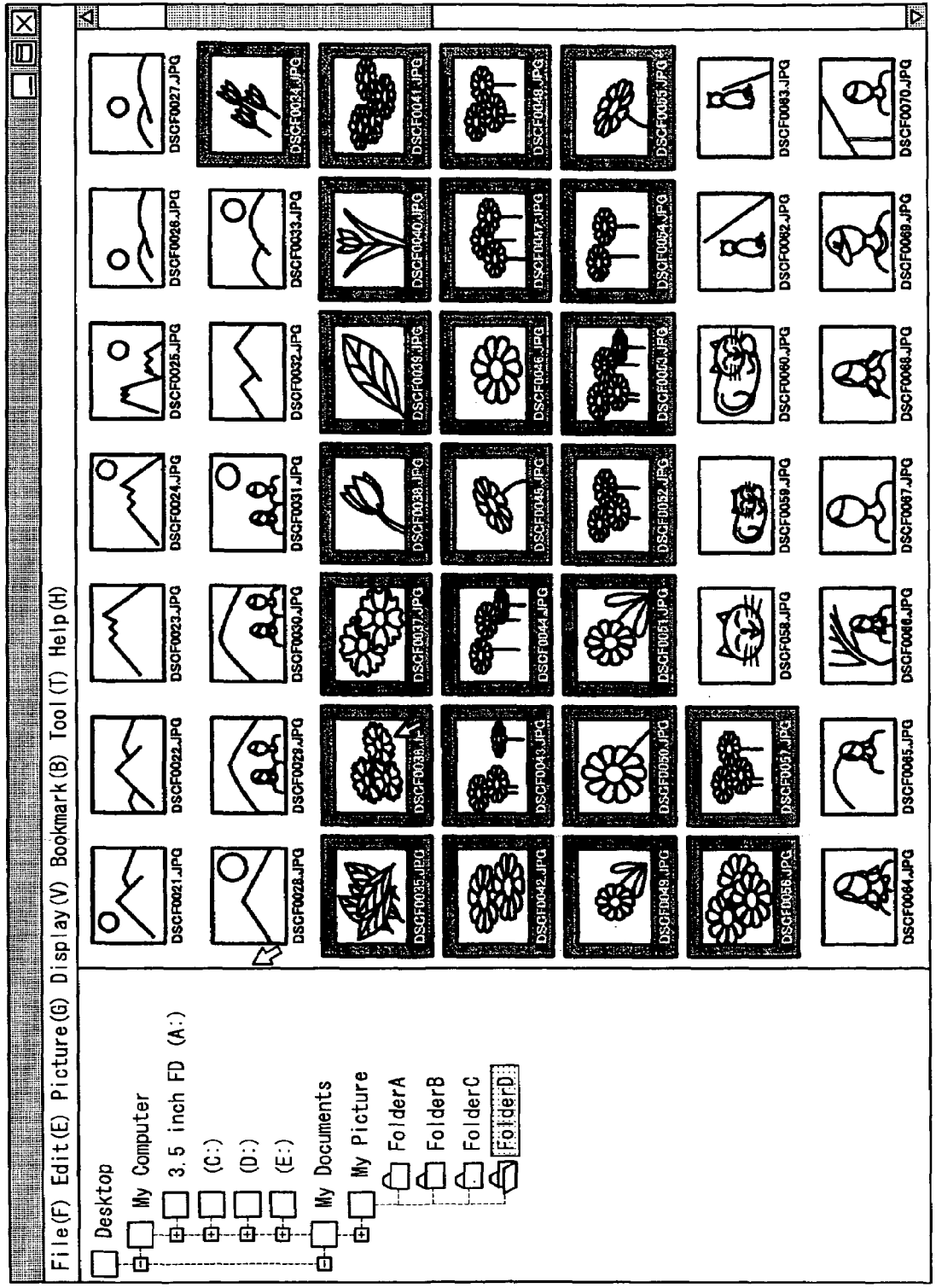
FIG. 13 is a diagram showing a display of a main window displayed after a process of replacing the file names with new file names in block.

As a result, frame numbers are given to pictures in the order of the pictures taken. When thumbnail pictures are listed in the thumbnail display region, the pictures appear in the order of the pictures taken as shown in FIG. 13 (if the pictures are displayed in the order of the frame numbers).

As the frame numbers are determined according to this process of replacing the file names with new file names in block, information of frame order determined=YES may be added to each of the extracted picture files.

Next, a function of adding information on date and time the picture taken on the extracted series of picture files (a function of editing date and time of the picture taken) will be described.

The function of editing date and time of the picture taken is executed on the extracted series of picture files extracted with a function of extracting picture files as the above mentioned function of replacing the file names with new file names in block.

Figure 14:
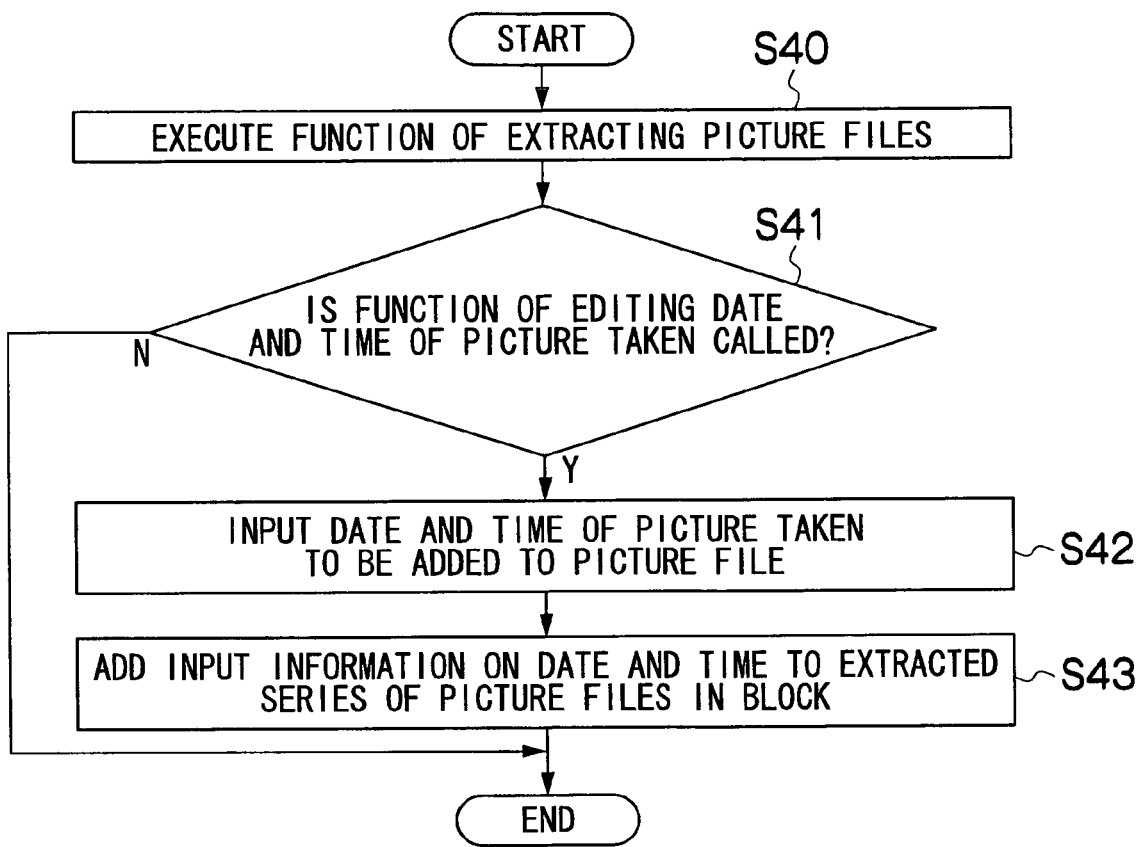
FIG. 14 is a flowchart showing a procedure of editing date and time of the picture taken.

FIG. 14 is a flowchart showing a procedure of editing date and time of the picture taken. When CPU 52 executes the process of editing date and time of the picture taken after the above mentioned process of extracting picture files, it first calls a function of editing date and time of the picture taken. CPU 52 executes the function of date and time of the picture taken by selecting "edit" from a menu displayed on the tool bar and selecting "editing date and time the picture taken" from "edit" menu (see FIG. 9).

After executing the above mentioned process of extracting picture files (step S40), CPU 52 determines whether the function of "editing date and time the picture taken" is called or not (step S41). When CPU 52 detects that the function of "editing date and time the picture taken" is called, it executes the process of editing date and time of the picture taken described below.

Figure 15:
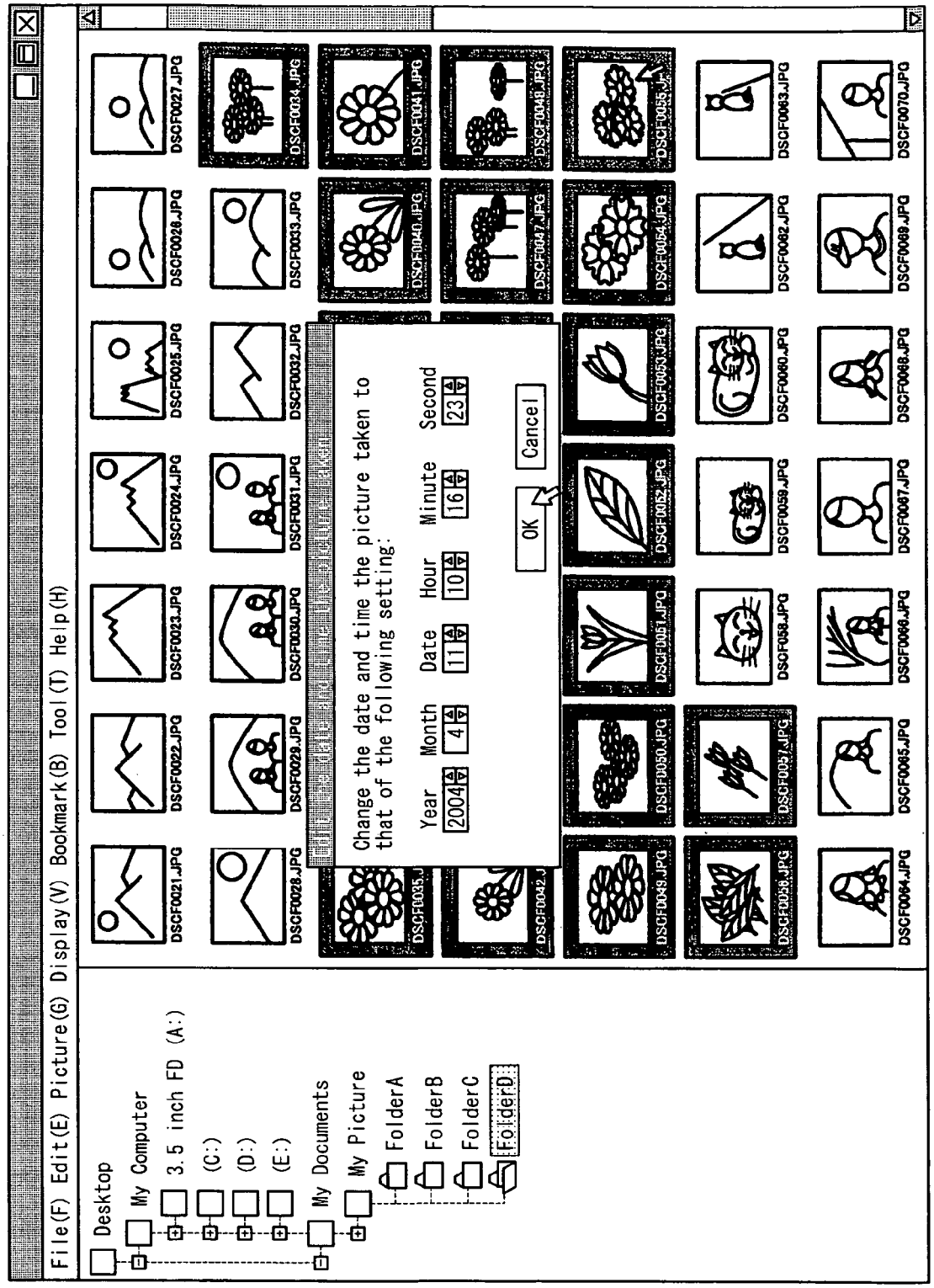
FIG. 15 is a diagram showing an example of main window displayed during a process of editing date and time when the picture taken.

As the process of editing date and time the picture taken is a function of adding information on date and time the picture taken to a picture file, a user has to input the date and time the picture taken to be added. Therefore, when the function of "editing date and time the picture taken" is called, CPU 52 pops up a dialog box for a user to input the date and time the picture taken on display device 60 as shown in FIG. 15.

The user inputs the date and time the picture taken to be added to the picture file in the field of the date and time the picture taken included in the pop-up dialog box (step S42). Then the user indicates to execute the process (clicks on "OK" button).

When an indication to execute the process is issued, CPU 52 adds the input information on date and time of the picture taken to the extracted series of picture files in block (step S43). The information on date and time of the picture taken is recorded in additional information of Eixf file, for example. In other words, Eixf file is adapted to record a tag regarding date and time as additional information as shown in FIG. 4. The date and time of the picture taken is recorded in date and time of original picture data generated in the tag regarding the date and time.

The user can add information on the actual date and time of the picture taken to the picture file read from a film by executing the process of editing date and time of the picture taken in this manner.

All information of date and time of the picture taken for extracted picture files is the same in the above mentioned process. A user can distinguish the extracted picture files in terms of time by executing the process below. When a user adds information of date and time of the picture taken to each picture file, the user adds the information with a certain difference in the order of the frame numbers. For example, if date and time of the picture taken to be added to the picture file is 00:00:00 on Jan. $1^{st}$, 2004 with a difference of ten minuets, information of date and time of the picture taken is added to each picture file with the set difference, such as information of date and time of the picture taken, "00:00:00 on Jan. $^{st}$, 2004", is added to the picture file with the top frame number, "00:10:00 on Jan. $1^{st}$, 2004" to the picture file with the next frame number, "00:20:00 on Jan. $1^{st}$, 2004" to the picture file with the following frame number, etc.

A procedure of the process of adding date and time of the picture taken with the difference will be described. In the case described below, processes can be selected; either a process of adding information of the same date and time of the picture taken to each picture file or a process of adding information of the date and time of the picture taken to each picture file with a difference.

Figure 16:
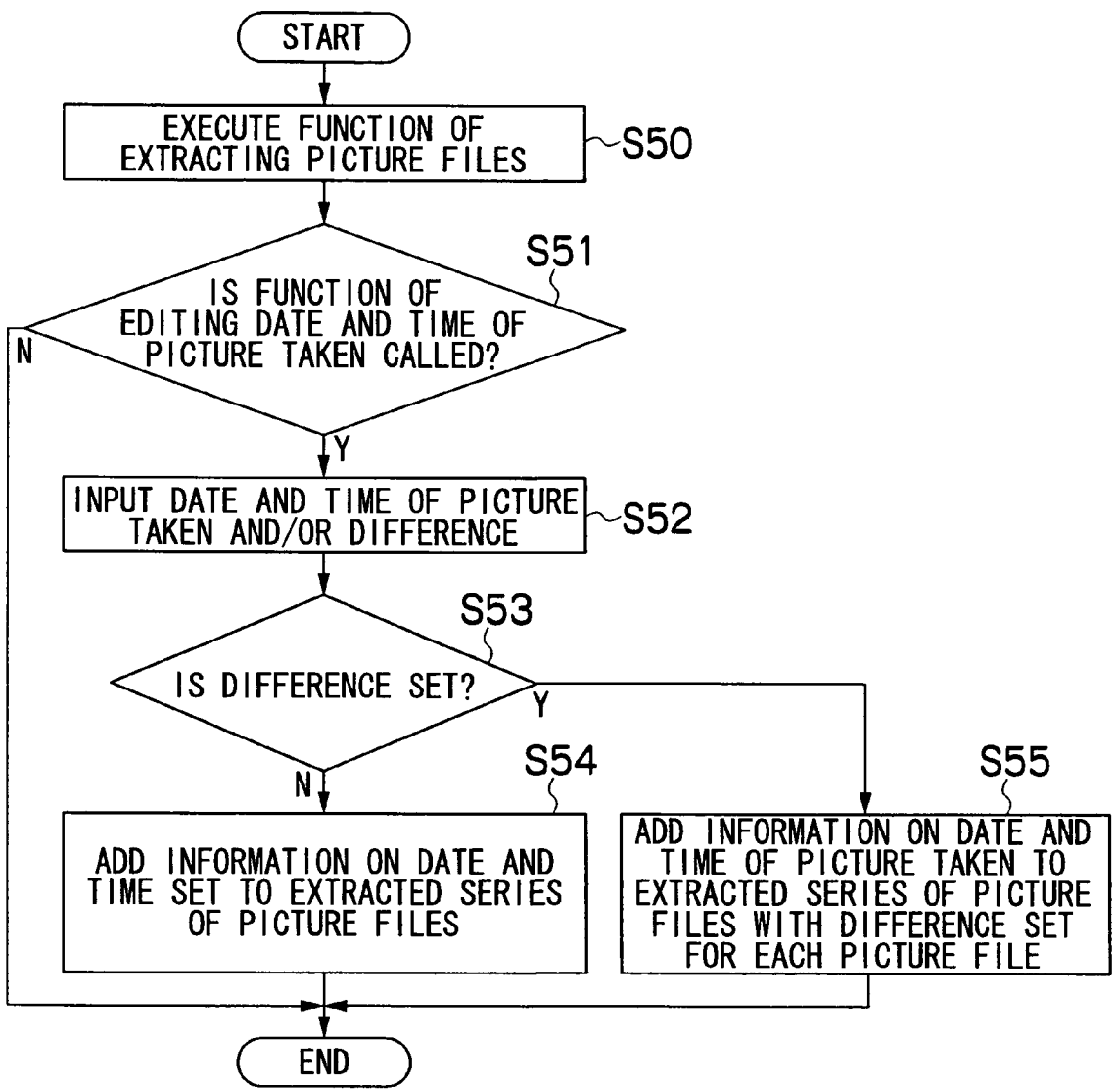
FIG. 16 is a flowchart showing a procedure of a process executed as a process is selected from a process of adding information of the same date and time of the picture taken to a picture file and a process of adding information of the date and time of the picture taken with a difference.

FIG. 16 is a flowchart showing a procedure of a process executed as a process is selected from a process of adding information of the same date and time of the picture taken to a picture file and a process of adding information of the date and time of the picture taken with a difference.

Similarly, after executing a process of extracting a picture file (step S50), CPU 52 determines whether a function of "editing date and time the picture taken" is called or not (step S51). When CPU 52 determines that the function of "editing date and time the picture taken" is called, it executes a process of editing date and time the picture taken described below.

Figure 17:
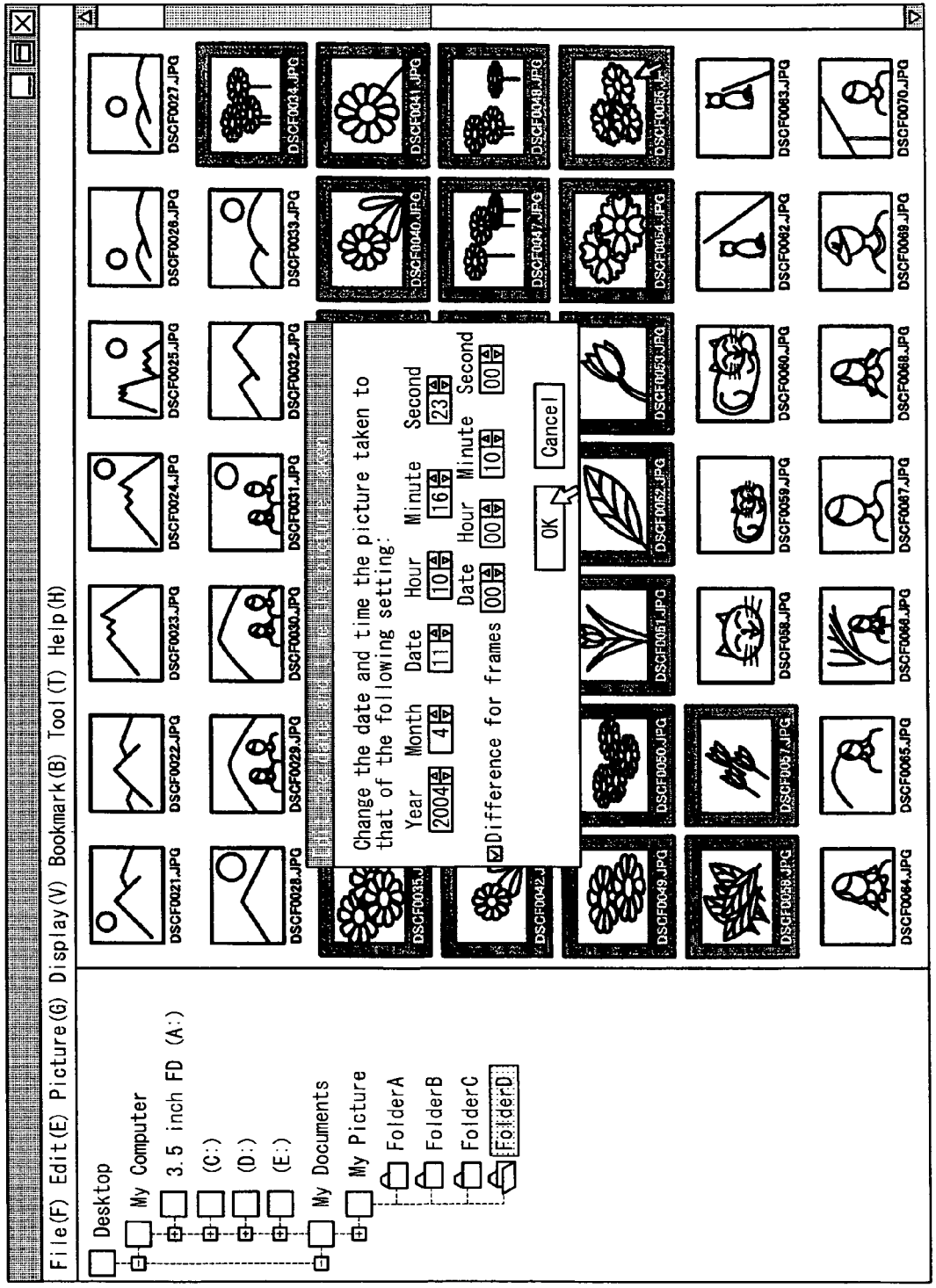
FIG. 17 is a diagram showing an example of a main window displayed during a process of editing date and time of the picture taken.

CPU 52 first pops up a dialog box for a user to input the date and time the picture taken and a difference on display device 60 as shown in FIG. 17. The user inputs the required information of editing the date and time the picture taken in the input field included in the pop-up dialog box (step S52).

The dialog box includes fields for inputting information of date and time the picture taken and for inputting information on a difference. The fields for inputting information on a difference include check boxes. When setting a difference for the date and time the picture taken in each picture file, the user checks the check box before the fields for inputting the information on a difference and inputs information on a difference.

When required information of editing date and time the picture taken is input and an execution of the process is indicated ("OK" button is clicked), CPU 52 determines whether a difference is set or not (step S53). When a difference is not set, CPU 52 adds input information of date and time the picture taken to the extracted series of picture files in block (step S54).

When a difference is set, CPU 52 adds information of date and time the picture taken to the extracted series of picture files with a difference set for each frame. In other words, CPU 52 adds input information of date and time the picture taken to the picture file with the top frame number, and adds information of date and time the picture taken to each picture file in the order of frame numbers as the date and time the picture taken added with the input difference (step S55).

For example, when the date and time the picture taken is set "00:00:00 on Jan. $1^{st}$, 2004" for an extracted series of picture files "DSCF0034. JPG"-"DSCF0057. JPG" with a difference of "00:10:00", the date and time the picture taken is added with a difference of ten minuets, such as the date and time the picture taken "00:00:00 on Jan. $1^{st}$, 2004" is added to a picture file "DSCF0034. JPG", "00:10:00 on Jan. $1^{st}$, 2004" to "DSCF0035. JPG", "00:20:00 on Jan. $1^{st}$, 2004" to "DSCF0036. JPG", etc., as shown in FIG. 17.

By adding information of date and time the picture taken to picture files with a certain difference, pictures can be displayed in the order the pictures taken when the pictures are displayed in the order of date and time the picture taken.

A difference is added in the order of the frame numbers. When information of date and time the picture taken is added to a picture file with a difference, it is assumed that the frame numbers are added to the picture files in the order the pictures taken.

As mentioned above, when wind information is added to a film, film digitize device 10 according to the embodiment can read pictures in the order of the pictures taken by reading the wind information. Film digitize device 10 can record the picture files on CD-ROM with frame numbers in the order of the picture taken. When film digitize device 10 reads the pictures in the order of the pictures taken, information of frame order determined=YES is added to the picture file.

Film digitize device 10 can determine whether the frame numbers are given to a group of picture files to be processed in the order of the pictures taken or not when it adds information of date and time the picture taken to picture files with a difference by using the presence of information of frame order determined YES added to the picture file. If it is determined that the frame numbers are added to the picture files in the order the pictures taken, information of date and time the picture taken can be added to picture files with a difference in the order of the frame numbers. If it is unknown whether or not the frame numbers are added to picture files in the order of the pictures taken, film digitize device 10 can prompt the user to check whether or not the frame numbers are added to the picture files in the order of the pictures taken.

A procedure of a process of editing the date and time the pictures taken for picture files using information of the frame order determined YES will be described below.

Figure 19:
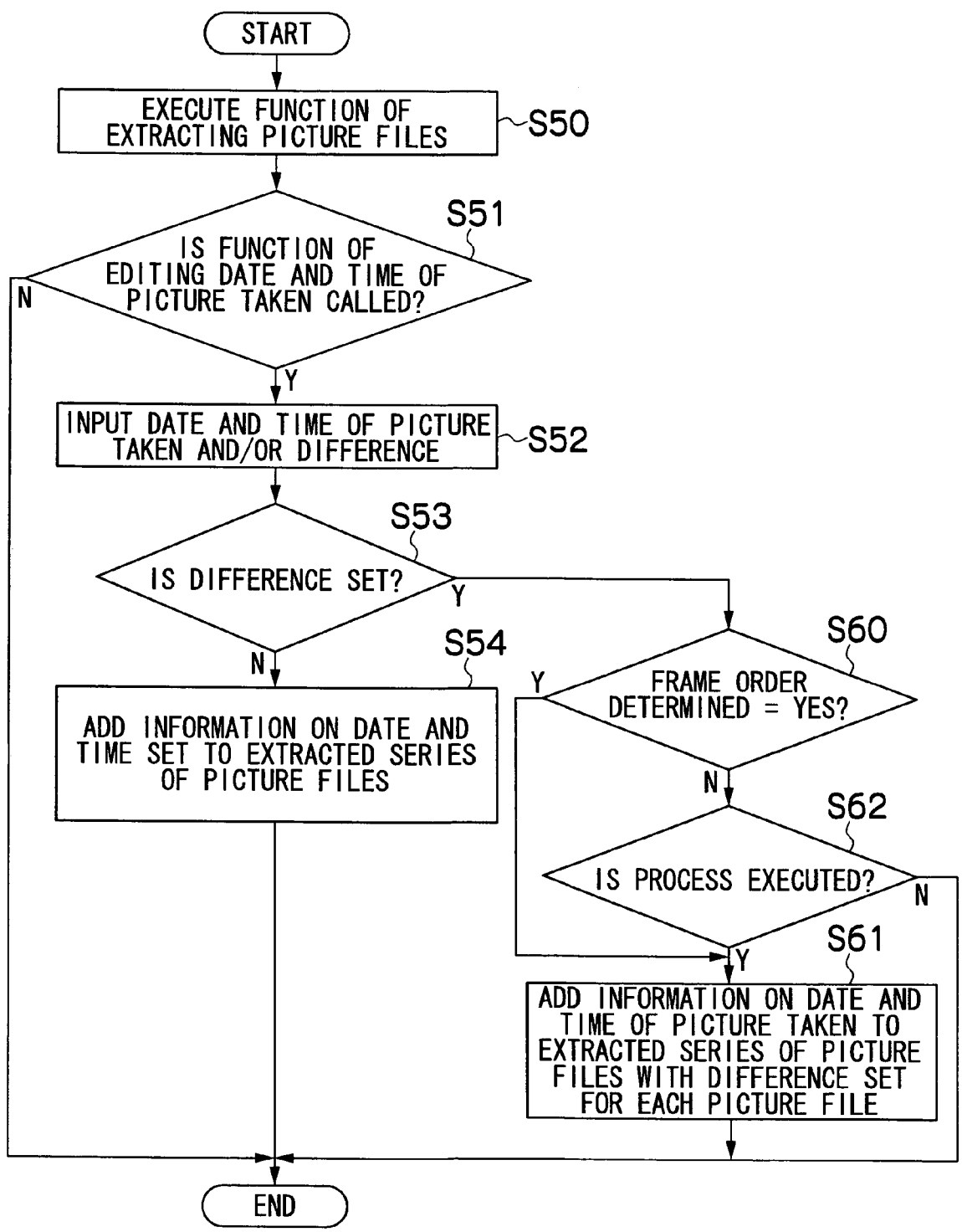
FIG. 19 is a flowchart showing a procedure of a process of editing the date and time the pictures taken for picture files using information of frame order determined YES.

FIG. 19 is a flowchart showing a procedure of a process of editing the date and time the pictures taken for picture files using information of frame order determined YES.

The process of adding information of the same date and time the pictures taken to an extracted series of picture files (steps S50-S54) is the same as that described above. Only the case where the date and time the pictures taken is added to each picture file with a difference (the case where a difference is set) will be described below.

If it is determined that a difference is set at step S53, CPU 52 determines whether or not information of frame order determined=YES is added to a group of picture files to be processed (step S60).

If information of frame order determined=YES is added to the group of picture files, CPU 52 adds information of the date and time the pictures taken in the order of frame numbers with a difference set for each frame for the extracted series of picture files (step S61).

Figure 20:
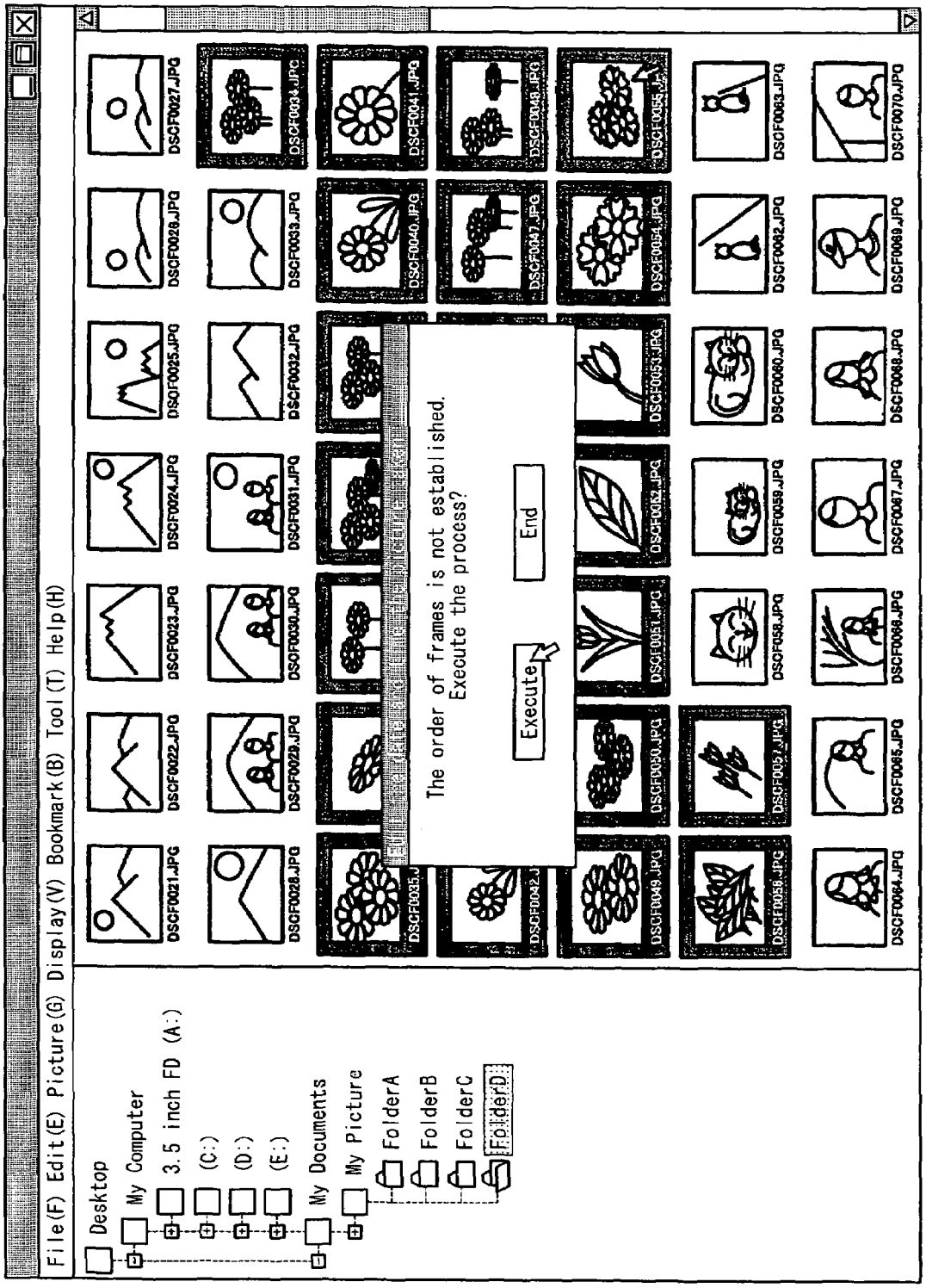
FIG. 20 is a diagram showing an example of a main window displayed during a process of editing date and time the picture taken.

If no information of frame order determined=YES is added to the group of picture files, i.e., frame order determined=NO, or if the group of picture files has no frame order determination information, CPU 52 pops up a dialog box showing a message for inquiring whether or not the process should be executed compulsorily as shown in FIG. 20 ("Frame order is not determined. Execute the process?") on display device 60.

The user decides whether or not to execute the process compulsorily in response to the message shown in the dialog box. In order to execute the process, the user clicks on "Execute" button. In order not to execute the process, the user clicks on "Exit" button.

CPU 52 determines whether or not to execute the process according to the input indication (step S62). When CPU 52 determines that the user indicates to execute the process, it adds information of date and time the picture taken in the order of the frame numbers with a difference set for each frame for the extracted series of picture files (step S61).

When CPU 52 determines that the user indicates to end the process, it terminates the process of editing the date and time the pictures taken. In this case, CPU 52 performs the above mentioned process of replacing the file names as required.

With the presence of information of frame order determined=YES added to a picture file, CPU 52 can avoid adding information of the date and time the pictures taken to picture files in the wrong order.

CPU 52 may be adapted to inquire whether or not to execute the process compulsorily all the time when it adds information of the date and time the pictures taken with a difference. In this case, the presence of information of frame order determined=YES is not required. Such that, information of frame order determined=YES/NO is not always required and not necessarily added to the read picture files in film digitize device 10.

Although this embodiment adds frame numbers to picture files by incorporating frame numbers in a part of a file name of a picture file, it can add frame numbers to picture files by recording the frame numbers in meta-data of the picture files.

Although the film digitize device according to the embodiment is adapted to record picture files read out from a film on a CD-R, a recording medium is not limited to a CD-R, and a recording medium such as DVD-R or MO can be used or picture files read from a film can be directly provided to a user via a network.

What is claimed is:

1. A film digitizing device reading pictures recorded on a film in an order starting at the top frame of the film and a picture management device managing picture data pieces read from the film with the film digitizing device, wherein the film digitizing device comprises:
   a picture processor converting the pictures into pieces of digital picture data frame by frame,
   a recorder recording the pieces of the digital picture data along with frame numbers in the order the pictures are read on a recording medium, and a recorder controller which records a series of picture data pieces read from the same film along with the same film ID information; and wherein the picture management device is accepting an indication of extracting picture data pieces along with information of the same film ID, extracting a series of picture data pieces along with information of the same film ID according to the indication of extracting picture data pieces, and adding information on date and time the picture taken to the extracted series of picture data pieces with a specified difference shifted in the order of frame numbers.

2. The film digitizing device according to claim 1, further comprising:

a wind information reading device which records wind information added to a film, wherein the digital picture data pieces are recorded on the recording medium along with the frame numbers in the order the pictures taken based on wind information read by the wind information reading device.

3. The film digitizing device according to claim 2, wherein the recorder controller records the digital picture data pieces on the recording medium along with the information of the film ID and information whether or not the frame numbers are given to the digital picture data pieces in the order the pictures taken.

4. A film digitizing device reading pictures recorded on a film in an order starting at the top frame of the film and a picture management device managing picture data pieces read from a film with the film digitizing device, wherein the film digitizing device comprises:

a picture processor converting the pictures into pieces of digital picture data frame by frame, a recorder recording the pieces of the digital picture data along with frame numbers in the order the pictures are read on a recording medium, and a recorder controller which records a series of picture data pieces read from the same film along with the same film ID information; and wherein the picture management device is accepting an indication of extracting picture data pieces along with information of the same film ID, extracting a series of picture data pieces along with information of the same film ID according to the indication of extracting picture data pieces, displaying thumbnail pictures of an extracted series of picture data pieces in the order of the frame numbers on a display device, accepting an indication of replacing the frame numbers for the extracted series of picture data pieces, and replacing the frame numbers of the extracted series of picture data pieces so that the order of thumbnail pictures displayed on the display device is reversed according to the indication of replacing the frame numbers.

5. A picture management program device comprising:

a computer useable medium having a computer readable code means embodied in said medium for managing picture data pieces read from a film with the film digitizing device according to claim 2, wherein the computer readable code means causes the computer to operate the functions of:

accepting an indication of extracting picture data pieces along with information of the same film ID; and extracting a series of picture data pieces along with information of the same film ID according to the indication of extracting picture data pieces.

6. A picture management program device comprising:

a computer useable medium having a computer readable code means embodied in said medium for managing picture data pieces read from a film with the film digitizing device according to claim 3, wherein the computer readable code means causes the computer to operate the functions of:

accepting an indication of extracting picture data pieces along with information of the same film ID; and extracting a series of picture data pieces along with information of the same film ID according to the indication of extracting picture data pieces.

7. The picture management program device according to claim 5, wherein the computer readable code means further causes the computer to operate the functions of:

displaying thumbnail pictures of an extracted series of picture data pieces in the order of the frame numbers on a display device;

accepting an indication of replacing the frame numbers for the extracted series of picture data pieces; and replacing the frame numbers of the extracted series of picture data pieces so that the order of thumbnail pictures displayed on the display device is reversed according to the indication of replacing the frame numbers.

8. The picture management program device according to claim 6, wherein the computer readable code means further causes the computer to operate the functions of:

displaying thumbnail pictures of an extracted series of picture data pieces in the order of the frame numbers on a display device;

accepting an indication of replacing the frame numbers for the extracted series of picture data pieces; and replacing the frame numbers of the extracted series of picture data pieces so that the order of thumbnail pictures displayed on the display device is reversed according to the indication of replacing the frame numbers.

9. The picture management device according to claim 4, further comprising adding information on specified date and time the picture taken to the extracted series of picture data pieces.

10. The picture management program device according to claim 5, wherein the computer readable code means further causes the computer to operate a function of adding information on specified date and time the picture taken to the extracted series of picture data pieces.

11. The picture management program device according to claim 6, wherein the computer readable code means further causes the computer to operate a function of adding information on specified date and time the picture taken to the extracted series of picture data pieces.

12. The picture management device according to claim 4, further comprises adding information on specified date and time the picture taken to the extracted series of picture data pieces.

13. The picture management program device according to claim 7, wherein the computer readable code means further causes the computer to operate a function of adding information on specified date and time the picture taken to the extracted series of picture data pieces.

14. The picture management program device according to claim 8, wherein the computer readable code means further causes the computer to operate a function of adding information on specified date and time the picture taken to the extracted series of picture data pieces.

15. The picture management device according to claim 11, further comprising adding information on date and time the picture taken to the extracted series of picture data pieces with a specified difference shifted in the order of frame numbers.

16. The picture management program device according to claim 10, wherein the computer readable code means further causes the computer to operate a function of adding information on date and time the picture taken to the extracted series of picture data pieces with a specified difference shifted in the order of frame numbers.

17. The picture management program device according to claim 11, wherein the computer readable code means further causes the computer to operate a function of adding information on date and time the picture taken to the extracted series of picture data pieces with a specified difference shifted in the order of frame numbers.

18. The picture management device according to claim 12, further comprises adding information on date and time the picture taken to the extracted series of picture data pieces with a specified difference shifted in the order of frame numbers.

19. The picture management program device according to claim 13, wherein the computer readable code means further causes the computer to operate a function of adding information on date and time the picture taken to the extracted series of picture data pieces with a specified difference shifted in the order of frame numbers.

20. The picture management program device according to claim 14, wherein the computer readable code means further causes the computer to operate a function of adding information on date and time the picture taken to the extracted series of picture data pieces with a specified difference shifted in the order of frame numbers.

21. A method of reading pictures recorded on a film in an order starting at the top frame of the film and managing picture data pieces read from the film, comprising:
   converting the pictures into pieces of digital picture data frame by frame,
   recording the pieces of the digital picture data along with frame numbers in the order the pictures are read on a recording medium,
   recording a series of picture data pieces read from the same film along with the same film ID information,
   accepting an indication of extracting picture data pieces along with information of the same film ID,
   extracting a series of picture data pieces along with information of the same film ID according to the indication of extracting picture data pieces, and
   adding information on date and time the picture taken to the extracted series of picture data pieces with a specified difference shifted in the order of frame numbers.

22. The picture management device comprising:
   a computer useable medium having a computer readable code means embodied in said medium for managing picture data pieces read from the film according to claim 1.

23. A method of reading pictures recorded on a film in an order starting at the top frame of the film and managing picture data pieces read from the film, comprising:
   converting the pictures into pieces of digital picture data frame by frame,
   recording the pieces of the digital picture data along with frame numbers in the order the pictures are read on a recording medium,
   recording a series of picture data pieces read from the same film along with the same film ID information,
   accepting an indication of extracting picture data pieces along with information of the same film ID,
   extracting a series of picture data pieces along with information of the same film ID according to the indication of extracting picture data pieces,
   displaying thumbnail pictures of an extracted series of picture data pieces in the order of the frame numbers on a display device,
   accepting an indication of replacing the frame numbers for the extracted series of picture data pieces, and
   replacing the frame numbers of the extracted series of picture data pieces so that the order of thumbnail pictures displayed on the display device is reversed according to the indication of replacing the frame numbers.

24. The picture management device comprising:
   a computer useable medium having a computer readable code means embodied in said medium for managing picture data pieces read from the film according to claim 4.

* * * * *